(12) United States Patent
Ramesh et al.

(10) Patent No.: US 12,155,499 B1
(45) Date of Patent: *Nov. 26, 2024

(54) DEVICE-STATE QUALITY ANALYSIS

(71) Applicant: Amazon Technologies, Inc., Seattle, WA (US)

(72) Inventors: Saranya Ramesh, Seattle, WA (US); Kalyan C. Nistala, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/127,833

(22) Filed: Mar. 29, 2023

Related U.S. Application Data

(63) Continuation of application No. 17/106,449, filed on Nov. 30, 2020, now Pat. No. 11,621,866, which is a continuation of application No. 16/360,869, filed on Mar. 21, 2019, now Pat. No. 10,855,483.

(51) Int. Cl.
*H04L 12/28* (2006.01)
*H04L 43/10* (2022.01)

(52) U.S. Cl.
CPC ...... *H04L 12/2807* (2013.01); *H04L 12/2825* (2013.01); *H04L 12/283* (2013.01); *H04L 43/10* (2013.01)

(58) Field of Classification Search
CPC ............ H04L 12/2807; H04L 12/2825; H04L 12/283; H04L 43/10
See application file for complete search history.

(56) References Cited

U.S. PATENT DOCUMENTS

| | | | |
|---|---|---|---|
| 10,586,177 B1 | 3/2020 | Choueiter et al. | |
| 2017/0164224 A1* | 6/2017 | Min | H04W 4/02 |
| 2017/0270922 A1 | 9/2017 | Fu | |
| 2017/0342741 A1 | 11/2017 | Holland et al. | |
| 2018/0006899 A1 | 1/2018 | Ogrinz | |
| 2019/0353709 A1 | 11/2019 | Kaisers | |
| 2021/0360269 A1 | 11/2021 | Zheng et al. | |

OTHER PUBLICATIONS

Office Action for U.S. Appl. No. 17/106,449, mailed on Aug. 26, 2022, Ramesh, "Device-State Quality Analysis", 9 pages.
Office Action for U.S. Appl. No. 17/106,449, mailed on Mar. 23, 2022, Ramesh, "Device-State Quality Analysis", 8 pages.

* cited by examiner

*Primary Examiner* — Mohamed A. Wasel
(74) *Attorney, Agent, or Firm* — Lee & Hayes, P.C.

(57) ABSTRACT

Systems and methods for device-state quality analysis include storing data indicating device state of a device and receiving additional data indicating the device state of the device. Data is then generated based on the stored and received device state data that indicate that the stored data is inaccurate. Confidence value data is then generated utilizing the generated data and prior device-state accuracy data.

20 Claims, 11 Drawing Sheets

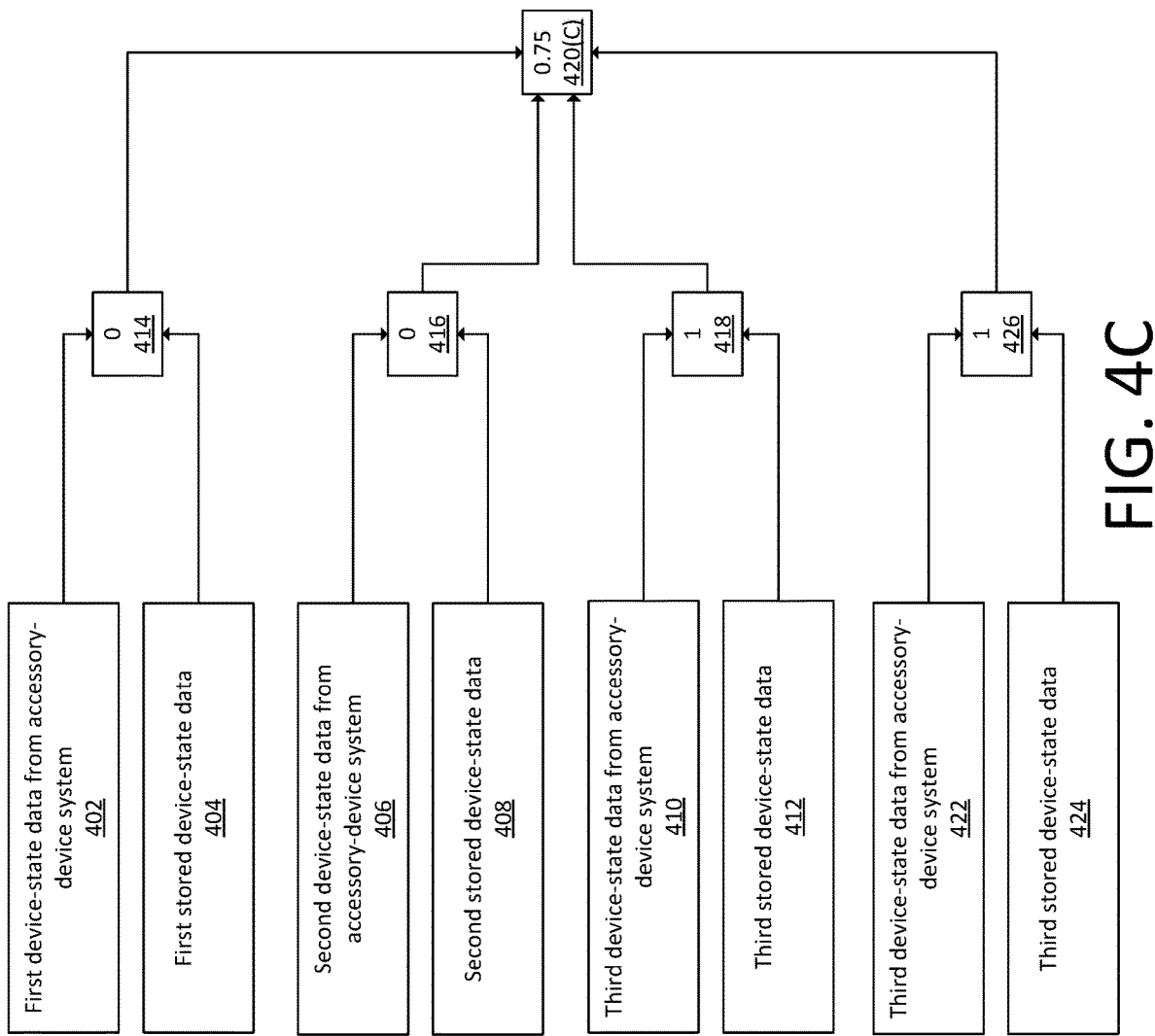

| Device Identifier | Application Identifier | Characteristic(s) | Last Poll | Enablement |
|---|---|---|---|---|
| DeviceIdentifier1 | AppIdentifier1 | on/off; color | 2018-02-25 | 2018-01-11 |
| DeviceIdentifier2 | AppIdentifier2 | lock/unlock | 2017-06-05 | 2016-12-25 |
| DeviceIdentifier3 | AppIdentifier3 | volume; on/off | 0 | 2019-01-28 |
| DeviceIdentifier4 | AppIdentifier4 | armed/disarmed | 2018-12-26 | 2018-11-15 |
| DeviceIdentifier5 | AppIdentifier5 | temperature | 2018-03-29 | 2017-09-26 |

FIG. 5

| Device Identifier | Application Identifier | Quality Score |
|---|---|---|
| DeviceIdentifier1 | AppIdentifier1 | 0.0 |
| DeviceIdentifier2 | AppIdentifier2 | 0.74 |
| DeviceIdentifier3 | AppIdentifier3 | 0.62 |
| DeviceIdentifier4 | AppIdentifier4 | 0.75 |
| DeviceIdentifier5 | AppIdentifier5 | 1.00 |

604 — New Request

FIG. 6

DEVICE-STATE QUALITY ANALYSIS

RELATED APPLICATIONS

This application claims priority to and is a continuation of U.S. patent application Ser. No. 17/106,449, filed on Nov. 30, 2020, which will issue as U.S. Pat. No. 11,621,866 on Apr. 4, 2023, which claims priority to and is a continuation of U.S. patent application Ser. No. 16/360,869, filed on Mar. 21, 2019, now known as U.S. Pat. No. 10,855,483, which issued on Dec. 1, 2020, all of which are incorporated herein by reference.

BACKGROUND

Smart-home devices have become ubiquitous. Smart-home devices may operate in multiple states, such as an "on" state and an "off" state, for example. Described herein are improvements in technology and solutions to technical problems that can be used to, among other things, improve data accuracy associated with device states.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4C illustrates a conceptual diagram of another example process for generating device-state quality data.

FIG. 5 illustrates an example of data stored in a database and utilized for device-state quality analysis.

FIG. 6 illustrates an example of data stored in a database and utilized for determining device identifiers of accessory devices to be polled for device-state quality analysis.

DETAILED DESCRIPTION

Figure 1:
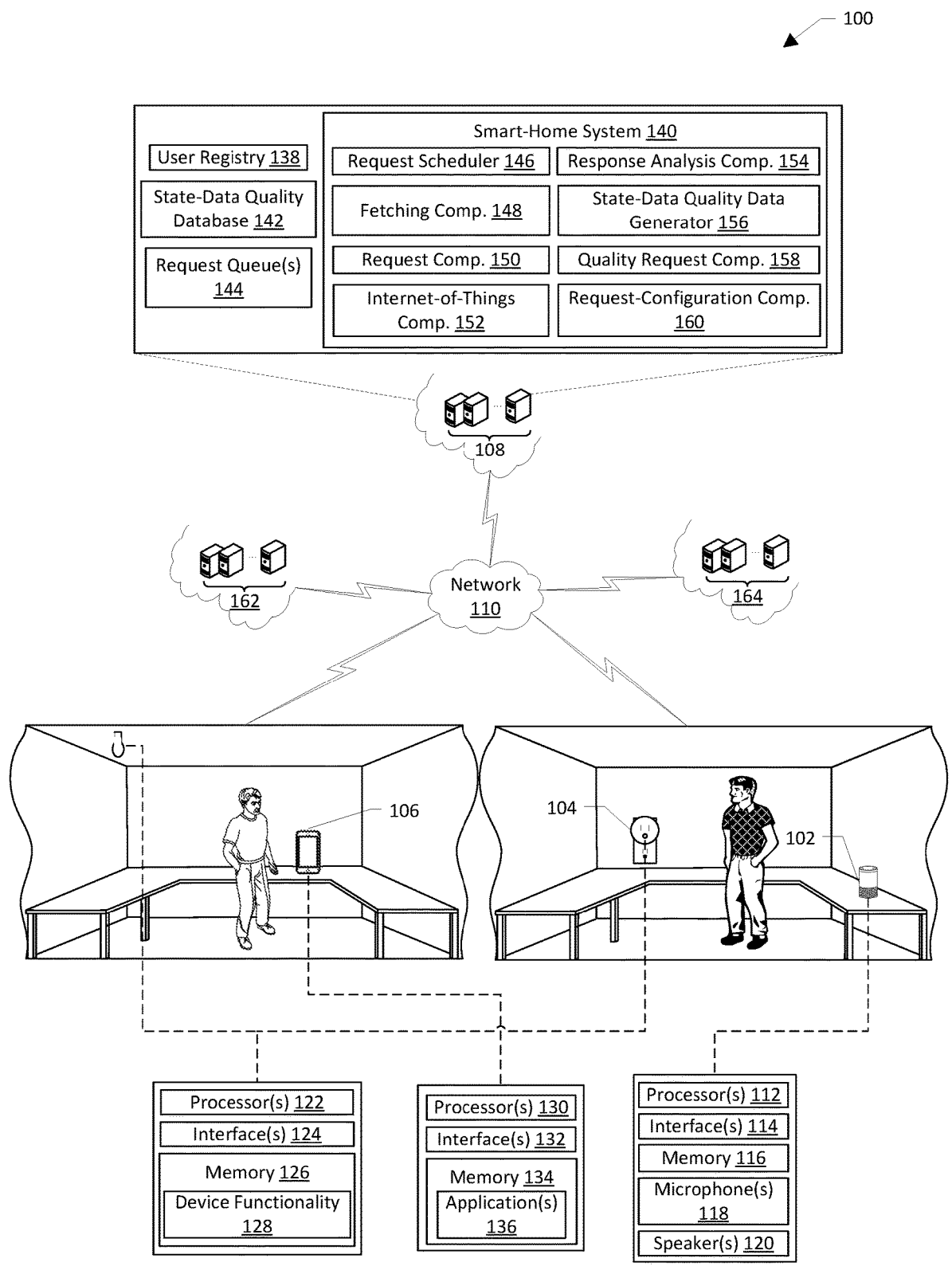
FIG. 1 illustrates a schematic diagram of an example environment for device-state quality analysis.

Systems and methods for device-state quality analysis are disclosed. Take, for example, a network of smart-home devices associated with a remote system that may be utilized to operate the smart-home devices. For example, a home may include one or more smart-home devices that may be operated by utilizing a hands-free device, such as a voice-enabled device, and/or a personal device, such as a cellular phone and/or tablet and/or computer. Other homes and/or other types of environments may include other smart-home devices. Given the proliferation of smart-home devices, hundreds of thousands, millions, or more smart-home devices may be in operation. Some or all of these smart-home devices, otherwise described as "accessory devices" herein, may operate in one or more states, such as, for example, an "on" state, an "off" state, a "locked" state, and "unlocked" state, an "armed" state, a "disarmed" state, etc. Additionally, or alternatively, the smart-home devices may be associated with one or more operational characteristics, such as illumination color when the accessory device is a light bulb, temperature when the accessory device is a thermometer and/or a kitchen appliance, an audio-playback status when the accessory device is an audio-output device, an image-play back status when the accessory device is a video-output device, etc.

In examples, such as when a polling system associated with voice-enabled devices and/or the personal device is utilized to operate the accessory devices, maintaining accurate data indicating a current state of the accessory device may be useful for one or more purposes. For example, target inference operations may depend, at least in part, on data showing which accessory devices are "on" and which accessory devices are "off." Additionally, accurate presentation of the current status of accessory devices to users of those devices may be difficult without accurate device-state data. In these and other use cases, it would be beneficial to confirm the accuracy of device-state data maintained by the polling system and/or to identify situations where the device-state data is inaccurate so that remedial measures may be taken.

To achieve the benefits described herein, the polling system may perform polling operations to request data from accessory-device systems indicating current device state. This data may be analyzed in association with stored device-state data to determine accuracies and/or inaccuracies in the stored device-state data. For example, a request scheduler of the polling system may schedule the generation of requests for the current device-state data from the accessory-device system(s). At the outset, the request scheduler may schedule generation of requests that include device identifiers of accessory devices that have not been polled. The polling system, for a given period of time, such as a day, may receive a command to generate a request from the request scheduler and/or may fetch additional data associated with a given command from a user registry of the polling system. The user registry may include information such as device identifiers, accessory-device system identifiers, application identifiers representing applications and/or "skills" associated with the accessory device system(s), and/or other identifying information associated with the accessory devices to be polled based at least in part on the schedules.

A request queue of the polling system may queue polling requests associated with the scheduled requests. A request component of the polling system may query the request queue and may generate requests for current device-state data from the accessory-device system(s). The requests may include one or more instructions to return current device-state results to the polling system for a given set of device identifiers. In examples, one or more other components of the polling system, such as an internet-of-things component, may facilitate the sending of the requests to the accessory-device system(s) and/or receipt of the responses from the accessory-device system(s). The request component may also utilize information from a request-configuration component to generate the requests. For example, some or all of the accessory-device systems may be associated with a request capacity, which may also be described as a TPS ("ticks per second") value, for a given period of time. For example, a first accessory-device system may have a request capacity of 1,000 device identifiers for a given day, while a second accessory-device system may have a request capacity of 100,000 device identifiers for a given day. In these and other examples, the request component may utilize this information to configure the requests to comply with the request capacity associated with a given accessory-device system.

Once a response is received from the accessory-device system, such as via the internet-of-things component, a response analysis component of the polling system may analyze the current device-state data from the response in association with stored device-state data for the device identifiers associated with the request. For example, the current device-state data may indicate that Device 1 is in an "on" state, but stored device-state data for Device 1 indicates that Device 1 is in an "off" state. In these examples, the response analysis component may determine that the current device-state data from the response differs from the stored device-state data. The same or a similar analysis may be performed for some or all of the device identifiers associated with the request. Data indicating the results of the analysis performed by the response analysis component may be stored and used as described elsewhere herein.

Additionally, a quality-data generator may be utilized to generate quality data that represents an accuracy of stored device-state data based at least in part on the results of the analysis described above. The quality data may provide an indication of an accuracy of stored device-state data for a given device and/or for devices associated with a given accessory-device system. The quality data may be generated using one or more techniques. For example, when response data is received for a given device identifier, the response data may be compared to stored device-state data. For instances, where the response data differs with respect to the stored device-state data, such as if the state of the device in question differs as between the current device-state data and the stored device-state data, an indication of this result, such as a "0," may be determined. For instances where the response data corresponds to the stored device-state data, such as if the state of the device in question is the same as between the current device-state data and the stored device-state data, an indication of this result, such as "1," may be determined. When the polling operations described above have been performed only once for a given accessory device, the quality data may indicate that the stored device-state data is either completely inaccurate in the case of "0" or completely accurate in the case of "1." In other examples where the polling operations have been performed multiple times for a given accessory device, the quality data may indicate an accuracy value from 0 and to 1 based at least in part on the values from device-state analysis for some or all of the polling operations.

For example, for a given device identifier, the polling operations may have been performed four times resulting in four indications that the stored device-state data is accurate or inaccurate. For example, the first polling operation may result in an inaccurate "0" result, the second polling operation may result in an inaccurate "0" result, the third polling operation may result in an accurate "1" result, and the fourth polling operation may result in an accurate "1" result. One or more scoring techniques may be utilized to generate the quality data described herein. For example, a first scoring technique may include utilizing the most recent polling operation result and not utilizing prior results. In this example, the first scoring technique may result in device-state quality data of a "1" and/or "100%" and/or "1.0" given that the fourth polling operation resulted in an accurate "1" result. In other examples, a second scoring technique may include determining the most frequent result and utilizing that result to generate device-state quality data. In an example with two inaccurate "0" results and one accurate "1" result, the most frequent result would be "0" and utilizing the second scoring technique may result in device-state quality data of "0" and/or "0%" and/or "0.0" In other examples, a third scoring technique may include averaging the polling operation result and, in some examples, weighting most recent polling operation results more than less recent polling operation results. In the example used above with four results, an unweighted averaging technique may result in device-state quality data of "0.5," given that two inaccurate "0" results and two accurate "1" results were determined. In a weighted averaging technique, the amount of occurrence of accurate "1" results may be determined, here 0.5. Additionally, the amount of occurrence of accurate "1" results across the most recent half of the occurrences may be determined, here 100% or 1.0. The two values may be summed and divided by two to determine the weighted value, here 0.75. The device-state quality data may be stored in association with the device identifier for the given device in question. It should be understood that the examples and/or values utilized above are for illustration only and are not exhaustive. Additional, or alternative, weighting and/or scoring techniques may be utilized, including, for example, time decay in defining the set and/or the weights applied to quality data.

At this point, for polling performed for certain accessory devices, a database of device-state quality data may be maintained and may provide an indication of which accessory devices are associated with accurate stored device-state data and which accessory devices are associated with inaccurate stored device-state data. Additionally, the device-state quality data may be utilized to inform subsequent polling operations. For example, for accessory devices that are associated with accurate device-state quality data, those accessory devices may not be polled in subsequent polling operations, and/or those accessory devices may be polled less frequently than accessory devices with less favorable device-state quality data. In examples, a threshold accuracy value may be established, and device identifiers associated with accuracy values that are less than the threshold accuracy value may be scheduled for subsequent polling and/or scheduled more frequently than device identifiers associated with accuracy values that are at least the threshold accuracy value.

Additionally, or alternatively, the polling system may be configured to receive priority requests for device-state quality data. For example, a developer and/or other user of the polling system may desire to receive and/or utilize device-state quality data, such as for a given set of accessory devices and/or a given type of accessory device and/or a given accessory-device system. The request may be received, and the request scheduler may schedule a request for polling as described herein. The scheduled request may be associated with a priority level, which may be more prioritized than the scheduled requests associated with accessory devices that have not yet been polled and/or than scheduled requests associated with accessory devices with less than favorable device-state quality data. The prioritized request may be associated with a priority request queue, and the request component may utilize the priority request queue to generate requests prior to utilizing the general request queue.

Additionally, or alternatively, the polling system may be configured to receive indications of accessory devices that are enabled for use for the first time. For example, when an accessory device is first plugged in by an end user and/or when the accessory device is first enabled for use, the accessory device and/or the accessory-device system may send an indication of this enablement to the polling system. The request scheduler may utilize this information to include device identifiers for the newly-enabled accessory devices in polling requests.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for device-state quality analysis. The system 100 may include, for example, a voice-enabled device 102. The voice-enabled device 102 may be configured to receive user utterances and perform operations in response to such user utterances. In these examples, the voice-enabled device 102 may be "hands free" such that interactions with the device are performed through audible requests and responses.

The system 100 may also include one or more accessory devices 104. The accessory devices 104 may be described as "smart" devices, which may have certain computing components and be configured to send and/or receive data from other devices. The accessory devices 104 may be, for example, light bulbs, plugs, locks, televisions, appliances, doorbells, cameras, etc. As shown in FIG. 1, the space in which the voice-enabled device 102 is situated may include an accessory device 104, which may be a plug in. The accessory device 104 may be "paired" or otherwise associated with the voice-enabled device 102. As such, the accessory device 104 may be configured to send data to and/or receive data from the voice-enabled device 102. The system 100 may also include a personal device 106, which may include a mobile phone, tablet, laptop, and/or other computing device. As shown in FIG. 1, the space in which the personal device 106 is situated may include an accessory device 104, which may be a light bulb. The voice-enabled device 102, the accessory devices 104, and/or the personal device 106 may be configured to send data to and/or receive data from a polling system 108, such as via a network 110. In examples, the voice-enabled device 102 and/or the accessory devices 104 may communicate directly with the system 108, via the network 110. While two spaces are depicted in FIG. 1, it should be understood that numerous other spaces may be included. The two spaces in FIG. 1 are used to show accessory devices 104 located in disparate locations, such as within a home, between homes, within a city, within a state, within a country, and/or with respect to the Earth. In general, the polling system 108 may be in communication with hundreds, thousands, millions, or more accessory devices 104 located in as many or fewer spaces. Additionally, a given space may include numerous voice-enabled devices 102 and/or personal devices 106, and/or accessory devices 104.

The voice-enabled device 102 may include one or more components, such as, for example, one or more processors 112, one or more network interfaces 114, memory 116, one or more microphones 118, and/or one or more speakers 120. The microphones 118 may be configured to capture audio, such as user utterances, and generate corresponding audio data. The speakers 120 may be configured to output audio, such as audio corresponding to audio data received from another device and/or the system 108. It should be understood that while several examples used herein include a voice-enabled device 102 that allows users to interact therewith via user utterances, one or more other devices, which may not include a voice interface, may be utilized instead of or in addition to voice-enabled devices 102. In these examples, the device may be configured to send and receive data over the network 110 and to communicate with the accessory device 104. As such, in each instance where a voice-enabled device is utilized, a computing device that does not include a voice interface may also or alternatively be used.

The accessory devices 104 may include one or more components, such as, for example, one or more processors 122, one or more network interfaces 124, and/or memory 126. The memory 126 may include one or more components, such as device functionality components 128. The memory 126 and/or processors 122 may be utilized to cause certain operations to be performed by the accessory devices 104, such as activating and/or deactivating the device functionality 128 of the accessory device 104. The device functionality 128 may include components associated with the intended use of the accessory devices 104. For example, one of the accessory devices 104 may be a light bulb, and in this example, the device functionality components 128 may include a filament and/or light emitting diode that may produce and/or emit light. By way of further example, another accessory device 104 may be a wall plug, and in this example, the device functionality components 128 may include an "on/off mechanism" for causing electricity to flow or not flow to a device that is plugged in to the wall plug. It should be noted that the device functionalities illustrated here are by way of example only.

The personal device 106 may include one or more components, such as, for example, one or more processors 130, one or more network interfaces 132, and/or memory 134. The memory 134 may include one or more components such as, for example, one or more applications 136 residing on the memory 134 and/or accessible to the personal device 106. The applications(s) 136 may be configured to cause the processor(s) 130 to receive information associated with interactions with the voice-enabled device 102 and cause display of representations, such as text and/or images, associated with the interactions. The application(s) 136 may also be utilized, in examples, to receive input data, such as from a user of the personal device 106, and send the input data and/or instructions associated with the input data to the polling system 108. The application(s) 136 may also be utilized to display notifications and/or alerts received, for example, from the polling system 108.

The polling system 108 may include components such as, for example, a user registry 138, a smart-home system 140, a state-data quality database 142, and/or one or more request queues 144. It should be understood that while the user registry 138, the state-data quality database 142, and the request queue(s) 144 are depicted as separate from the smart-home system 140 in FIG. 1, some or all of the components may be a part of the smart-home system 140. The smart-home system 140 may include a request scheduler 146, a fetching component 148, a request component 150, an internet-of-things component 152, a response analysis component 154, a quality-data generator 156, a quality request component 158, and/or a request-confirmation component 160. Additionally, the polling system 108 may include a speech-processing system, which may include an automatic speech recognition (ASR) component and/or a natural language understanding (NLU) component. Each of the components described herein with respect to the polling system 108 may be associated with their own systems, which collectively may be referred to herein as the polling system 108, and/or some or all of the components may be associated with a single system. Additionally, the polling system 108 may include one or more applications, which may be described as skills and/or may be similar to the applications 136 described with respect to the personal device 106. "Skills," as described herein may be applications and/or may be a subset of an application. For example, a skill may receive as input data representing an intent. For example, an intent may be determined by a natural language understanding component and/or as determined from user input via a computing device. Skills may be configured to utilize the intent to output data for a text-to-speech system's input, a link or other resource locator for audio data, and/or a command to a device, such as an accessory device. In instances where a voice-enabled device is utilized, skills may extend the functionality of an accessory device that can be controlled user a voice-user interface. In some examples, skills may be a type of application that may be useable in association with accessory devices and may have been developed specifically to work in connection with given accessory devices. In examples, a non-skill application may be an application that does not include the functionality of a skill. Speechlets, as described herein, may be a type of application that may be usable in association with voice-enabled devices and may have been developed specifically to work in connection with voice-enabled devices. The applications(s) may be configured to cause processor(s) to receive information associated with interactions with the voice-enabled device 102. The application(s) may also be utilized, in examples, to receive input data, such as from a user of the personal device 106 and/or the voice-enabled device 102, and send the input data and/or instructions associated with the input data to one or more other devices. The components of the polling system 108 are described in detail below: In examples, some or each of the components of the polling system 108 may include their own processor(s), network interface(s), and/or memory. As such, by way of example, the speech-processing system may include and/or be associated with processor(s), network interface(s), and/or memory. The smart-home system 140 may include and/or be associated with different processor(s), network interface(s), and/or memory, or one or more of these components may utilize some or all of the same processor(s), network interface(s), and/or memory utilized by the speech-processing system. These components are described in detail below: Additionally, the operations and/or functionalities associated with and/or described with respect to the components of the polling system 108 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 138 may be configured to identify, determine, and/or generate associations between users, user accounts, and/or devices. For example, one or more associations between user accounts may be identified, determined, and/or generated by the user registry 138. The user registry 138 may additionally store information indicating one or more applications and/or resources accessible to and/or enabled for a given user account. Additionally, the user registry 138 may include information indicating device identifiers, such as naming identifiers, associated with a given user account, as well as device types associated with the device identifiers. The user registry 138 may also include information indicating user account identifiers, naming indicators of devices associated with user accounts, and/or associations between devices, such as the voice-enabled device 102 and the accessory devices 104. The user registry 138 may also include information associated with usage of the voice-enabled devices 102 and/or the accessory devices 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system may be configured to receive audio data from the voice-enabled device 102 and perform speech-processing operations. For example, the ASR component may be configured to generate text data corresponding to the audio data, and the NLU component may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "turn on Rob's light," the NLU component may identify a "turn on" intent and the payload may be "Rob's light." In this example where the intent data indicates an intent to activate an accessory device 104 with a device identifier of "Rob's light," the speech-processing system may call one or more speechlets to effectuate the intent. Speechlets, as described herein may otherwise be described as applications and may include functionality for utilizing intent data to generate directives and/or instructions. For example, a smart-home speechlet associated with the smart-home system 140 may be called when the intent indicates that an action is to be performed in association with an accessory device 104. The speechlet may be designated as being configured to handle the intent of turning on and/or turning off an accessory device 104, for example. The speechlet may receive the intent data and/or other data associated with the user utterance from the NLU component, such as by an orchestrator of the polling system 108, and may perform operations to instruct the voice-enabled device 102 and/or the accessory device 104 to perform an operation.

The request scheduler 146 of the smart-home system 140 may be configured to schedule generation of requests for polling operations. For example, the request scheduler 146 may schedule generation of requests for the current device-state data from one or more accessory-device system(s) 162, 164. At the outset, the request scheduler 146 may schedule generation of requests that include device identifiers of accessory devices 104 that have not yet been polled for current device-state data. The request scheduler 146 may query a database of device identifiers corresponding to accessory devices 104 to determine which device identifiers have been used for polling operations and which device identifiers have not been used for polling operations. The request scheduler 146 may update the scheduled requests and/or may schedule new request based at least in part on the information obtained from the database, such as over time.

The fetching component 148 may be configured to, for a given period of time, such as a day, receive a command to generate a polling request from the request scheduler 146 and/or may fetch additional data associated with a given schedule from the user registry 138. For example, the user registry 138 may include information such as device identifiers, accessory-device system identifiers, application identifiers representing applications and/or "skills" associated with the accessory device system(s), and/or other identifying information associated with the accessory devices to be polled based at least in part on the schedules. As such, the fetching component 148 may fetch information to be used to generate requests for current device-state data.

The request queue(s) 144 may be configured to receive the scheduling information from the fetching component 148, along with the additional information to be used to generate requests for current device-state data. The request queue(s) 144 may, at least temporarily, store this information and may be responsive to one or more other components of the polling system 108 when called upon for the information. When priority polling requests are submitted, as discussed more elsewhere herein, the request queues 144 may include a general request queue and a priority request queue. The priority request queue may be configured to store information associated with priority polling requests.

The request component 150 may be configured to generate requests for current device-state data from the accessory-device systems 162, 164. The request component 150 may query the request queue(s) 144 for the device identifiers and application identifiers associated with a given polling schedule. The application(s), otherwise described herein as skill(s), may include a web component that may run in the polling system 108. Application(s) may receive and respond to requests utilizing the voice-enabled device 102 and/or the personal device 106. Applications(s) may define life-cycle events for an application as experienced by a user, a way to process speech requests from the user, and/or call-backs from events happening on the device the user is interacting with. Given applications(s) may be capable of handling certain intents. For example, the NLU component may generate intent data that indicates an intent as well as a payload associated with the intent. An application may be associated with the intent, and thus the intent data, including the payload may be sent to and received by the application. The application may process that intent by analyzing the payload and generating data representing a directive and/or instruction to perform an action. The directive and/or instruction may be sent to other components of the system for performance of the action. With the application identifier, which provides an indication of the accessory-device system 162, 164 to be polled, and the device identifiers, which provides an indication of which accessory devices 104 are to be polled, the request component 150 may generate one or more requests for the current device-state status of the accessory devices 104 in question.

When generating the requests, the request component 150 may receive, from the request-configuration component 160 and for some or all of the accessory-device systems 162, 164, a request capacity, which may also be described as a TPS ("ticks per second") value, for a given period of time. For example, a first accessory-device system 162 may have a request capacity of 1,000 device identifiers for a given day, while a second accessory-device system 164 may have a request capacity of 100,000 device identifiers for a given day. In these and other examples, the request component 150 may utilize this information to configure the requests to comply with the request capacity associated with a given accessory-device system 162, 164. The requests may include one or more instructions to return current device-state results to the polling system 108 for a given set of device identifiers. In examples, one or more other components of the polling system, such as an internet-of-things component 152, may facilitate the sending of the requests to the accessory-device system(s) 162, 164 and/or receipt of the responses from the accessory-device system(s) 162, 164. The internet-of-things component 152 may be configured to, in examples, format the requests to comply with conditions and/or requirements of a given accessory-device system 162, 164. The internet-of-things component 152 may also provide security measures for the sending and/or receipt of data with the accessory-device systems 162, 164.

The internet-of-things component 152 may be further configured to receive responses from the accessory-device systems 162, 164. A response may include current device-state data indicating a current device state for the accessory devices 104 that were polled. Once a response is received from the accessory-device system 162, 164, such as via the internet-of-things component 152, a response analysis component 154 may analyze the current device-state data from the response in association with stored device-state data for the device identifiers associated with the request. For example, the current device-state data may indicate that Device 1 is in an "on" state, but stored device-state data for Device 1 indicates that Device 1 is in an "off" state. In these examples, the response analysis component 154 may determine that the current device-state data from the response differs from the stored device-state data. The same or a similar analysis may be performed for some or all of the device identifiers associated with the request. Data indicating the results of the analysis performed by the response analysis component may be stored and used as described elsewhere herein.

By way of additional example, the stored device-state data may be generated when an indication of a device-state change is received by the polling system 108. For example, when an accessory device 104 changes from an "off" state to an "on" state, the accessory device 104 and/or the accessory-device system 162, 164 may send data indicating the state change. Additionally, or alternatively, a user may query for a device state using the voice-enabled device 102 and/or the personal device 106. For example, the user may provide a user utterance such as "what is the status of Light 1?" The polling system 108, in attempting to respond to the user, may request the device status from the accessory-device system 162, 164 associated with Light 1. In other examples, the user may navigate to a screen on the personal device 106 that indicates device status of one or more accessory devices 104. When the user navigates to such a screen, the polling system 108 may request a device status for device indicators to be displayed on the screen. In these and other examples, an indication of a state change may be received by the polling system 108 and data indicating the state of a device may be stored.

The quality-data generator 156 may be utilized to generate quality data based at least in part on the results of the analysis described above. The quality data may provide an indication of a confidence associated with the stored device-state data for a given device and/or for devices associated with a given accessory-device system 162, 164. The quality data may be generated using one or more techniques. For example, when that response data is received for a given device identifier, the response data may be compared to the stored device-state data. For instances where the response data differs with respect to the stored device-state data, such as if the state of the device in question differs as between the current device-state data and the stored device-state data, an indication of this result, such as a "0," may be determined. For instances where the response data corresponds to the stored device-state data, such as if the state of the device in question is the same as between the current device-state data and the stored device-state data, an indication of this result, such as "1," may be determined. When the polling operations described above have been performed only once for a given accessory device 104, the quality data may indicate that the stored device-state data is either completely inaccurate in the case of "0" or completely accurate in the case of "1." In other examples where the polling operations have been performed multiple times for a given accessory device 104, the quality data may indicate an accuracy value based at least in part on the values from device-state analysis for some or all of the polling operations.

For example, for a given device identifier, the polling operations may have been performed four times resulting in four indications that the stored device-state data is accurate or inaccurate. For example, the first polling operation may result in an inaccurate "0" result, the second polling operation may result in an inaccurate "0" result, the third polling operation may result in an accurate "1" result, and the fourth polling operation may result in an accurate "1" result. One or more scoring techniques may be utilized to generate the quality data described herein. For example, a first scoring technique may include utilizing the most recent polling operation result and not utilizing prior results. In this example, the first scoring technique may result in device-state quality data of a "1" given that the fourth polling operation resulted in an accurate "1" result. In other examples, a second scoring technique may include determining the most frequent result and utilizing that result to generate device-state quality data. In an example with two inaccurate "0" results and one accurate "1" result, the most frequent result would be "0" and utilizing the second scoring technique may result in device-state quality data of "0.0". In other examples, a third scoring technique may include averaging the polling operation result and, in some examples, weighting most recent polling operation results more than less recent polling operation results. In the example used above with four results, an unweighted averaging technique may result in device-state quality data of "0.5," given that two inaccurate "0" results and two accurate "1" results were determined. In a weighted averaging technique, the amount of occurrence of accurate "1" results may be determined, here 0.5. Additionally, the amount of occurrence of accurate "1" results across the most recent half of the occurrences may be determined, here 100% and/or 1.0. The two values may be summed and divided by two to determine the weighted value, here 0.75. The device-state quality data may be stored in association with the device identifier for the given device in question, such as in the state-data quality database 142.

At this point, for polling performed for certain accessory devices 104, a database 142 of device-state quality data may be maintained and may provide an indication of which accessory devices 104 are associated with accurate stored device-state data and which accessory devices 104 are associated with inaccurate stored device-state data. Additionally, the device-state quality data may be utilized to inform subsequent polling operations. For example, for accessory devices 104 that are associated with accurate device-state quality data, those accessory devices 104 may not be polled in subsequent polling operations, and/or those accessory devices 104 may be polled less frequently than accessory devices 104 with less favorable device-state quality data. In examples, a threshold accuracy value may be established, and device identifiers associated with accuracy values that are less than the threshold accuracy value may be scheduled for subsequent polling and/or scheduled more frequently than device identifiers associated with accuracy values that are at least the threshold accuracy value.

Additionally, or alternatively, the polling system 108 may be configured to receive priority requests for device-state quality data, such as using the quality request component 158. For example, a developer and/or other user of the polling system 108 may desire to receive and/or utilize device-state quality data, such as for a given set of accessory devices 104 and/or a given type of accessory device 104 and/or a given accessory-device system 162, 164. The request may be received utilizing the quality request component 158, and the request scheduler 146 may generate a schedule for polling as described herein. The schedule may be associated with a priority level, which may be more prioritized than the schedules associated with accessory devices 104 that have not yet been polled and/or than schedules associated with accessory devices 104 with less than favorable device-state quality data. The prioritized schedule may be associated with a priority request queue 144, and the request component 150 may utilize the priority request queue 144 to generate requests prior to utilizing the general request queue.

Additionally, or alternatively, the polling system 108 may be configured to receive indications of accessory devices 104 that are enabled for use for the first time. For example, when an accessory device 104 is first plugged in by an end user and/or when the accessory device 104 is first enabled for use, the accessory device 104 and/or the accessory-device system 162, 164 may send an indication of this enablement to the polling system 108. The request scheduler 146 may utilize this information to include device identifiers for the newly-enabled accessory devices 104 in polling schedules.

It should be noted that while text data is described as a type of data utilized to communicate between various components of the polling system 108 and/or other systems and/or devices, the components of the polling system 108 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the voice-enabled device 102.

As shown in FIG. 1, several of the components of the polling system 108 and the associated functionality of those components as described herein may be performed by one or more of the voice-enabled devices 102, the accessory devices 104, and/or the personal device 106. Additionally, or alternatively, some or all of the components and/or functionalities associated with the voice-enabled devices 102, the accessory devices 104, and/or the personal device 106 may be performed by the polling system 108.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or with the polling system and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 112, 122, 130, and/or the processor(s) described with respect to the components of the polling system 108, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 112, 122, 130, and/or the processor(s) described with respect to the components of the polling system 108 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 112, 122, 130, and/or the processor(s) described with respect to the components of the polling system 108 may possess its own local memory, which also may store program components, program data, and/or one or more operating systems.

The memory 116, 126, 134, and/or the memory described with respect to the components of the polling system 108 may include volatile and nonvolatile memory, removable and non-removable media implemented in any method or technology for storage of information, such as computer-readable instructions, data structures, program component, or other data. Such memory 116, 126, 134, and/or the memory described with respect to the components of the polling system 108 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 116, 126, 134, and/or the memory described with respect to the components of the polling system 108 may be implemented as computer-readable storage media ("CRSM"), which may be any available physical media accessible by the processor(s) 112, 122, 130, and/or the processor(s) described with respect to the polling system 108 to execute instructions stored on the memory 116, 126, 134, and/or the memory described with respect to the components of the polling system 108. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 116, 126, 134, and/or the memory described with respect to the components of the polling system 108, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project: other UNIX or UNIX-like variants: a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

The network interface(s) 114, 124, 132, and/or the network interface(s) described with respect to the components of the polling system 108 may enable messages between the components and/or devices shown in system 100 and/or with one or more other polling systems, as well as other networked devices. Such network interface(s) 114, 124, 132, and/or the network interface(s) described with respect to the components of the polling system 108 may include one or more network interface controllers (NICs) or other types of transceiver devices to send and receive messages over the network 110.

For instance, each of the network interface(s) 114, 124, 132, and/or the network interface(s) described with respect to the components of the polling system 108 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 114, 124, 132, and/or the network interface(s) described with respect to the components of the polling system 108 may include a wide area network (WAN) component to enable message over a wide area network.

In some instances, the polling system 108 may be local to an environment associated the voice-enabled devices 102 and/or the personal device 106. For instance, the polling system 108 may be located within one or more of the voice-enabled devices 102, and/or the personal device 106.

In some instances, some or all of the functionality of the polling system 108 may be performed by one or more of the voice-enabled devices 102 and/or the personal device 106. Also, while various components of the polling system 108 have been labeled and named in this disclosure and each component has been described as being configured to cause the processor(s) to perform certain operations, it should be understood that the described operations may be performed by some or all of the components and/or other components not specifically illustrated.

Figure 2:
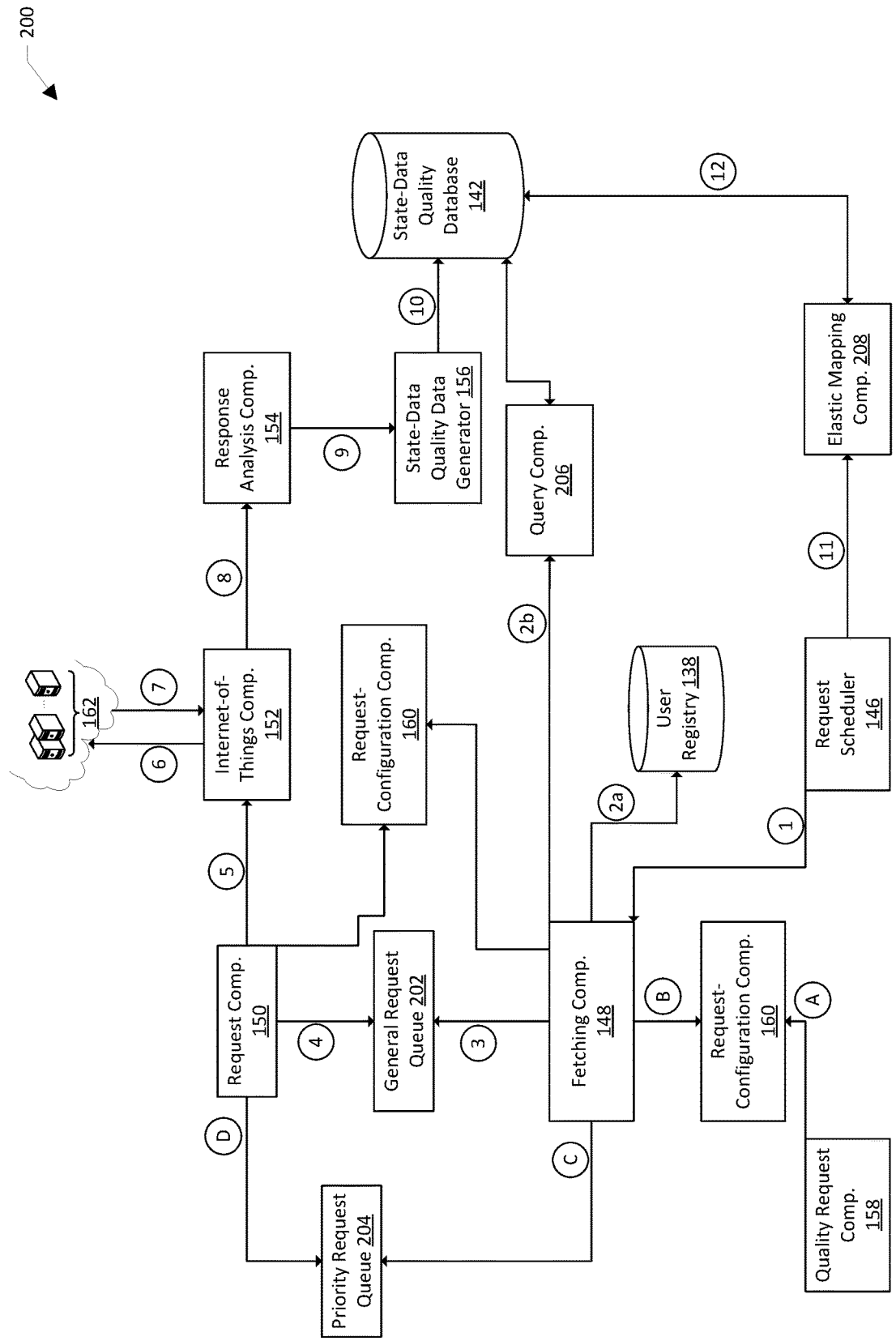
FIG. 2 illustrates a conceptual diagram of example components of a system for device-state quality analysis.

FIG. 2 illustrates a conceptual diagram of example components of a system 200 for device-state quality analysis. The system 200 may include some or all of the components as described with respect to FIG. 1. For example, the system 200 may include a request scheduler 146, a fetching component 148, a request component 150, an internet-of-things component 152, a response analysis component 154, a quality-data generator 156, a quality request component 158, a request-configuration component 160, a state-data quality database 142, and/or one or more request queues, such as a general request queue 202 and/or a priority request queue 204. The components are shown and described using steps 1-12 and A-D, as illustrated in FIG. 2. It should be understood that while steps 1-12 and A-D are described in sequential order, some or all of the operations may be performed in an order other than that described herein and/or some or all of the operations may be performed in parallel.

At step 1, the request scheduler 146 may schedule generation of requests for current device-state data from an accessory-device system 162. At the outset, the request scheduler 146 may schedule generation of requests that include device identifiers of accessory devices that have not been polled. The request scheduler 146 may query a database of device identifiers corresponding to accessory devices to determine which device identifiers have been used for polling operations and which device identifiers have not been used for polling operations. The request scheduler 146 may update the scheduled requests and/or may generate new scheduled requests at least in part on the information obtained from the database, such as over time.

At step 2a, the fetching component 148 may be configured to, for a given period of time, such as a day, receive a command from the request scheduler 146 to schedule a request and/or fetch additional data associated with a given scheduled request from the user registry 138. For example, the user registry 138 may include information such as device identifiers, accessory-device system identifiers, application identifiers representing applications and/or "skills" associated with the accessory device system(s), and/or other identifying information associated with the accessory devices to be polled based at least in part on the schedules. As such, the fetching component 148 may fetch information to be used to generate requests for current device-state data.

At step 3, the general request queue 202 may be configured to receive the scheduling information from the fetching component 148, along with the additional information to be used to generate requests for current device-state data. The general request queue 202 may, at least temporarily, store this information and may be responsive to one or more other components of the system when called upon for the information.

A step 4, the request component 150 may be configured to generate requests for current device-state data from the accessory-device system 162. The request component 150 may query the request queue 202 for the device identifiers and application identifiers associated with a given polling schedule. Based at least in part on the application identifier, which provides an indication of the accessory-device system 162 to be polled, and the device identifiers, which provides an indication of which accessory devices are to be polled, the request component 150 may generate one or more requests for the current device-state status of the accessory devices in question.

When generating the requests, the request component 150 may receive, from the request-configuration component 160 and for some or all of the accessory-device systems 162, a request capacity, which may also be described as a TPS value, for a given period of time. For example, a first accessory-device system 162 may have a request capacity of 1,000 device identifiers for a given day, while a second accessory-device system, such as the second accessory-device system 164 from FIG. 1, may have a request capacity of 100,000 device identifiers for a given day. In these and other examples, the request component 150 may utilize this information to configure the requests to comply with the request capacity associated with a given accessory-device system 162. The requests may include one or more instructions to return current device-state results to the system for a given set of device identifiers.

At step 5, in examples, the request component 150 may send the request to the internet-of-things component 152, which may facilitate the sending of the requests to the accessory-device system 162 and/or receipt of the responses from the accessory-device system 162. The internet-of-things component 152 may be configured to, in examples, format the requests to comply with conditions and/or requirements of a given accessory-device system 162. The internet-of-things component 152 may also provide security measures for the sending and/or receipt of data with the accessory-device systems 162.

At step 6, the internet-of-things component may send the request to the accessory-device system 162.

At step 7, the internet-of-things component 152 may be receive responses from the accessory-device system 162. The response may include current device-state data indicating a current device state for the accessory devices that were polled. Once a response is received from the accessory-device system 162, such as via the internet-of-things component 152, at step 8, a response analysis component 154 may analyze the current device-state data from the response in association with stored device-state data for the device identifiers associated with the request. For example, the current device-state data may indicate that Device 1 is in an "on" state, but stored device-state data for Device 1 indicates that Device 1 is in an "off" state. In these examples, the response analysis component 154 may determine that the current device-state data from the response differs from the stored device-state data. The same or a similar analysis may be performed for some or all of the device identifiers associated with the request. Data indicating the results of the analysis performed by the response analysis component 154 may be stored and used as described elsewhere herein.

At step 9, the quality-data generator 156 may be utilized to generate quality data based at least in part on the results of the analysis described above. The quality data may provide an indication of a confidence and/or accuracy associated with the stored device-state data for a given device and/or for devices associated with a given accessory-device system 162. The quality data may be generated using one or more techniques. For example, when that response data is received for a given device identifier, the response data may be compared to the stored device-state data. For instances where the response data differs with respect to the stored device-state data, such as if the state of the device in question differs as between the current device-state data and the stored device-state data, an indication of this result, such as a "0," may be determined. For instances where the response data corresponds to the stored device-state data, such as if the state of the device in question is the same as between the current device-state data and the stored device-state data, an indication of this result, such as "1," may be determined. When the polling operations described above have been performed only once for a given accessory device, the quality data may indicate that the stored device-state data is either completely inaccurate in the case of "0" or completely accurate in the case of "1." In other examples where the polling operations have been performed multiple times for a given accessory device 104, the quality data may indicate an accuracy value based at least in part on the values from device-state analysis for some or all of the polling operations.

For example, for a given device identifier, the polling operations may have been performed six times resulting in six indications that the stored device-state data is accurate or inaccurate. For example, the first polling operation may result in an inaccurate "0" result, the second polling operation may result in an inaccurate "0" result, the third polling operation may result in an accurate "1" result, the fourth polling operation may result in an accurate "1" result, the fifth polling operation may result in an accurate "1" result, and the sixth polling operation may result in an inaccurate "0" result. One or more scoring techniques may be utilized to generate the quality data described herein. For example, a first scoring technique may include utilizing the most recent polling operation result and not utilizing prior results. In this example, the first scoring technique may result in device-state quality data of a "0" given that the sixth polling operation resulted in an accurate "0" result. In other examples, a second scoring technique may include determining the most frequent result and utilizing that result to generate device-state quality data. In an example with two inaccurate "0" results and one accurate "1" result, the most frequent result would be "0" and utilizing the second scoring technique may result in device-state quality data of "0.0." In other examples, a third scoring technique may include averaging the polling operation result and, in some examples, weighting most recent polling operation results more than less recent polling operation results. In the example used above with six results, an unweighted averaging technique may result in device-state quality data of "0.5," given that three inaccurate "0" results and three accurate "1" results were determined. In a weighted averaging technique, the amount of occurrence of accurate "1" results may be determined, here 0.5. Additionally, the amount of occurrence of accurate "1" results across the most recent half of the occurrences may be determined, here 0.66. The two values may be summed and divided by two to determine the weighted value, here 0.58.

At step 10, the device-state quality data may be stored in association with the device identifier for the given device in question, such as in the state-data quality database 142. At this point, for polling performed for certain accessory devices, the database 142 of device-state quality data may be maintained and may provide an indication of which accessory devices are associated with accurate stored device-state data and which accessory devices 104 are associated with inaccurate stored device-state data. Additionally, the device-state quality data may be utilized to inform subsequent polling operations. For example, for accessory devices that are associated with accurate device-state quality data, those accessory devices may not be polled in subsequent polling operations, and/or those accessory devices may be polled less frequently than accessory devices with less favorable device-state quality data. In examples, a threshold accuracy value may be established, and device identifiers associated with accuracy values that are less than the threshold accuracy value may be scheduled for subsequent polling and/or scheduled more frequently than device identifiers associated with accuracy values that are at least the threshold accuracy value. For example, at step 11, the request scheduler 146, when subsequently scheduling requests, may query an elastic mapping component 208 for information on which accessory devices are associated with less than favorable device-state quality data. The elastic mapping component 208, at step 12, may query the state-data quality database 142 for data indicating which device identifiers have been polled and the quality data associated with the device identifiers. The elastic mapping component 208 may generate an aggregated list of some or all of the device identifiers and may provide an indication to the request scheduler 146 of which device identifiers are associated with accuracy values that are less than a threshold accuracy value, and/or device identifiers that have not yet been polled and/or that a threshold amount of time has passed since polling has been performed and/or device identifiers that have not been reachable and/or that have not returned communication, such as for a certain period of time. The request scheduler 146 may utilize the information from the elastic mapping component 208 to schedule polling requests.

In examples where the accuracy value for a given polling operation indicates that stored device-state data is inaccurate, the system 200 may be configured to generate new stored device-state data from the response data received from the accessory-device system 162. For example, if the current device-state data indicates that a given device is in an "off" state but the stored device-state data indicates that the device is in an "on" state, the system 200 may replace the stored device-state data with new data indicating that the device is in the "off" state.

Returning back to the fetching component 148 following step 1, at step 2b, the fetching component 148 may request information from the query component 206. For example, when the request scheduler 146 schedules generation of requests that includes device identifiers for devices associated with less than favorable quality data, the fetching component 148 may be utilized to fetch data associated with the device identifier, such as application identifications, a date and/or dates when the device-state for the device was polled, and/or the accuracy values determined in prior polling operations. This information may be returned to the fetching component 148 and may be utilized to generate polling requests.

Additionally, or alternatively, the system 200 may be configured to receive priority requests for device-state quality data, such as using a quality request component 158. For example, a developer and/or other user of the system may desire to receive and/or utilize device-state quality data, such as for a given set of accessory devices and/or a given type of accessory device and/or a given accessory-device system 162. The request may be received, and, at step A, the quality request component 158 may fetch information associated with the device identifiers to be polled from the request-configuration component 160.

At step B, the quality request component 158 may send a command to schedule the priority request to the fetching component 148. The command may be associated with a priority level, which may be more prioritized than the scheduled requests associated with accessory devices that have not yet been polled and/or than scheduled requests associated with accessory devices with less than favorable device-state quality data. The fetching component 148 may send, at step C, the prioritized request and/or information associated therewith to the priority request queue 204. At step D, the request component 150 may utilize the priority request queue 144 to generate requests prior to utilizing the general request queue 202.

It should be understood that while several of the components described with respect to FIG. 2 are described as performing certain functionalities, at least some of the components may not be used to perform accessory-device device-state polling. For example, the general request queue 202 and/or the priority request queue 204 may not be utilized, and instead the request component 150 may utilize the information from the fetching component 148 and/or request-configuration component 160 directly. Additionally, the request-configuration component 160 may not be utilized, and TPS values may be received from the accessory-device systems 162. Additionally, the query component 206 and/or the elastic mapping component 208 may not be utilized and the information utilized by the request scheduler 146 and/or the fetching component 148 may be received directly from the state-data quality database 142.

Figure 3:
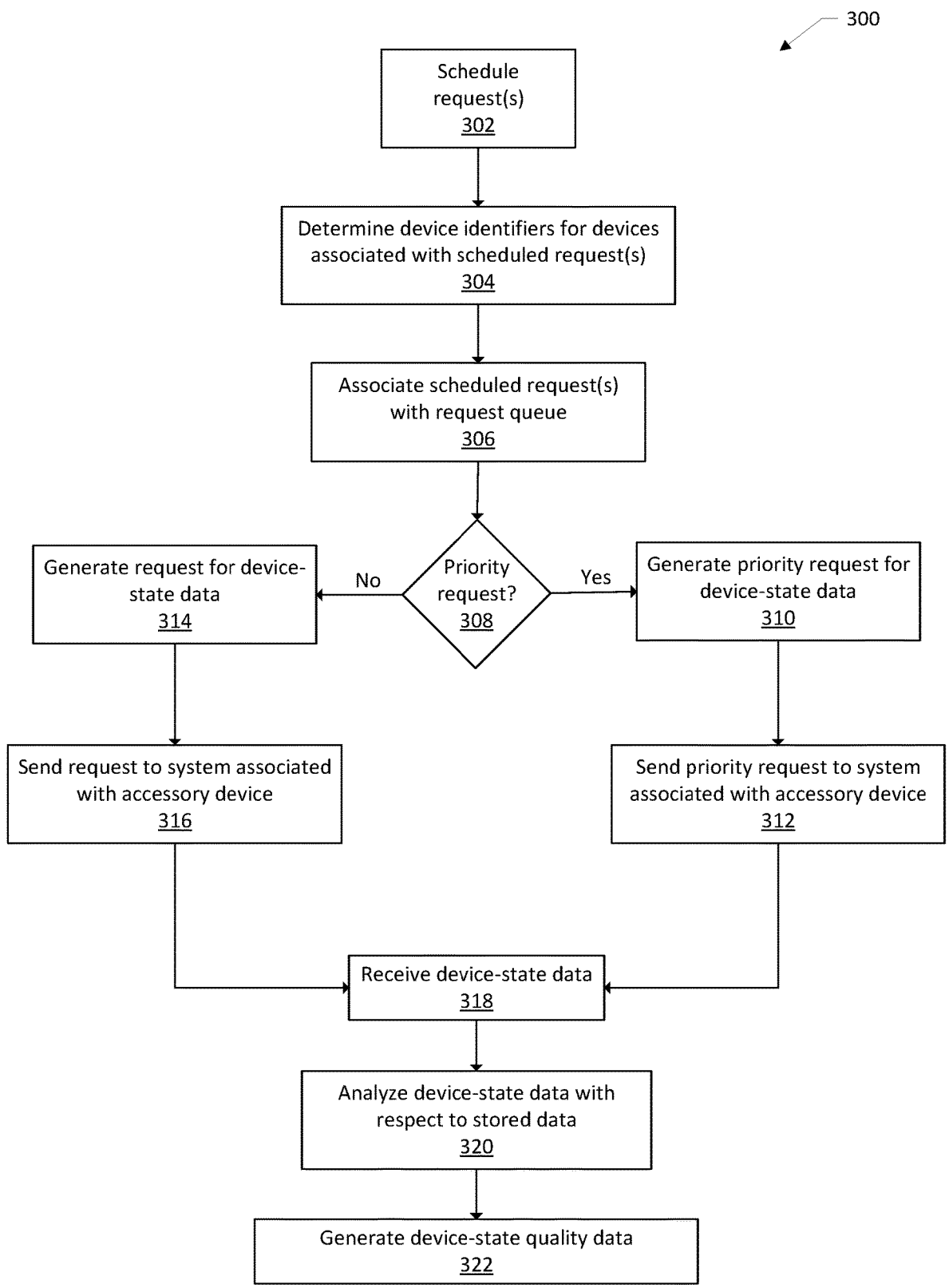
FIG. 3 illustrates a flow diagram of an example process for device-state quality analysis.

FIG. 3 illustrates processes for device-state quality analysis. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, and 4A-7, although the processes may be implemented in a wide variety of other environments, architectures and systems.

FIG. 3 illustrates a flow diagram of an example process 300 for device-state quality analysis. The order in which the operations or steps are described is not intended to be construed as a limitation, and any number of the described operations may be combined in any order and/or in parallel to implement process 300.

At block 302, the process 300 may include scheduling one or more polling requests. For example, a request scheduler may schedule generation of requests for current device-state data from an accessory-device system. Initially, the request scheduler may schedule generation of requests that include device identifiers of accessory devices that have not been polled. The request scheduler may query a database of device identifiers corresponding to accessory devices to determine which device identifiers have been used for polling operations and which device identifiers have not been used for polling operations. The request scheduler may update the scheduled requests and/or may generate new scheduled requests based at least in part on the information obtained from the database, such as over time.

At block 304, the process 300 may include determining device identifiers for devices associated with the scheduled requests. For example, a fetching component may be configured to, for a given period of time, such as a day, receive commands from the request scheduler and/or may fetch additional data associated with a given scheduled request from the user registry. For example, the user registry may include information such as device identifiers, accessory-device system identifiers, application identifiers representing applications and/or "skills" associated with the accessory device system(s), and/or other identifying information associated with the accessory devices to be polled based at least in part on the scheduled requests. As such, the fetching component may fetch information to be used to generate requests for current device-state data.

At block 306, the process 300 may include associating the scheduled requests with one or more request queues. For example, a request queue may be configured to receive the scheduling information from the fetching component, along with the additional information to be used to generate requests for current device-state data. The request queue may, at least temporarily, store this information and may be responsive to one or more other components of the system when called upon for the information.

At block 308, the process 300 may include determining whether a given scheduled request is a priority request. For example, a developer and/or user of the system may desire to receive quality data for certain accessory devices. In these examples, the developer and/or user may provide a priority request for such information. Prioritized requests may be associated with priority request queues. If the scheduled request is a priority request, then at block 310, the process 300 may include generating a priority request for device-state data. For example, a request component may query the request queue for the device identifiers and application identifiers associated with a given polling request. Based at least in part on the application identifier, which provides an indication of the accessory-device system to be polled, and the device identifiers, which provides an indication of which accessory devices are to be polled, the request component may generate one or more requests for the current device-state status of the accessory devices in question.

When generating the requests, the request component may receive, from a request-configuration component and for some or all of the accessory-device systems, a request capacity, which may also be described as a TPS value, for a given period of time. For example, a first accessory-device system may have a request capacity of 1,000 device identifiers for a given day, while a second accessory-device system may have a request capacity of 100,000 device identifiers for a given day. In these and other examples, the request component may utilize this information to configure the requests to comply with the request capacity associated with a given accessory-device system. The requests may include one or more instructions to return current device-state results to the system for a given set of device identifiers.

At block 312, the process 300 may include sending the priority request to an accessory-device system associated with the accessory device to be polled according to the schedule. In examples, the request component may send the request to an internet-of-things component, which may facilitate the sending of the requests to the accessory-device system and/or receipt of the responses from the accessory-device system. The internet-of-things component may be configured to, in examples, format the requests to comply with conditions and/or requirements of a given accessory-device system. The internet-of-things component may also provide security measures for the sending and/or receipt of data with the accessory-device systems. The internet-of-things component may send the request to the accessory-device system.

Returning to block 308, if no additional priority scheduled requests are pending and/or if the scheduled request was not a priority request, then at block 314, the process 300 may include generating a request for device-state data. Generating non-priority requests may be performed in the same or a similar manner as generation of the priority requests, as described above, except that the information for generating the non-priority requests may be received from a general request queue instead of the priority request queue.

At block 316, the process 300 may include sending the request to the accessory-device system associated with the accessory device. Sending the request to the accessory-device system may be performed in the same or a similar manner as described above with respect to block 312.

At block 318, the process 300 may include receiving device-state data from the accessory-device system. The device-state data may include an indication of a current device state of some or all of the accessory devices that were polled.

At block 320, the process 300 may include analyzing the device-state data with respect to stored device-state data. For example, the current device-state data may indicate that Device 1 is in an "on" state, but stored device-state data for Device 1 indicates that Device 1 is in an "off" state. In these examples, a response analysis component may determine that the current device-state data from the response differs from the stored device-state data. The same or a similar analysis may be performed for some or all of the device identifiers associated with the request. Data indicating the results of the analysis performed by the response analysis component may be stored and used as described elsewhere herein.

At block 322, the process 300 may include generating device-state quality data based at least in part on the results of the analysis described with respect to block 320. The quality data may provide an indication of a confidence and/or accuracy associated with the stored device-state data for a given device and/or for devices associated with a given accessory-device system. The quality data may be generated using one or more techniques. For example, when that response data is received for a given device identifier, the response data may be compared to the stored device-state data. For instances where the response data differs with respect to the stored device-state data, such as if the state of the device in question differs as between the current device-state data and the stored device-state data, an indication of this result, such as a "0," may be determined. For instances where the response data corresponds to the stored device-state data, such as if the state of the device in question is the same as between the current device-state data and the stored device-state data, an indication of this result, such as "1," may be determined. When the polling operations described above have been performed only once for a given accessory device, the quality data may indicate that the stored device-state data is either completely inaccurate in the case of "0" or completely accurate in the case of "1." In other examples where the polling operations have been performed multiple times for a given accessory device 104, the quality data may indicate an accuracy value based at least in part on the values from device-state analysis for some or all of the polling operations.

For example, for a given device identifier, the polling operations may have been performed six times resulting in six indications that the stored device-state data is accurate or inaccurate. For example, the first polling operation may result in an inaccurate "0" result, the second polling operation may result in an inaccurate "0" result, the third polling operation may result in an accurate "1" result, the fourth polling operation may result in an accurate "1" result, the fifth polling operation may result in an accurate "1" result, and the sixth polling operation may result in an inaccurate "0" result. One or more scoring techniques may be utilized to generate the quality data described herein. For example, a first scoring technique may include utilizing the most recent polling operation result and not utilizing prior results. In this example, the first scoring technique may result in device-state quality data of a "0" given that the sixth polling operation resulted in an inaccurate "0" result. In other examples, a second scoring technique may include determining the most frequent result and utilizing that result to generate device-state quality data. In an example with two inaccurate "0" results and one accurate "1" result, the most frequent result would be "0" and utilizing the second scoring technique may result in device-state quality data of "0.0." In other examples, a third scoring technique may include averaging the polling operation result and, in some examples, weighting most recent polling operation results more than less recent polling operation results. In the example used above with six results, an unweighted averaging technique may result in device-state quality data of "0.5," given that three inaccurate "0" results and three accurate "1" results were determined. In a weighted averaging technique, the amount of occurrence of accurate "1" results may be determined, here 0.5. Additionally, the amount of occurrence of accurate "1" results across the most recent half of the occurrences may be determined, here 0.66. The two values may be summed and divided by two to determine the weighted value, here 0.58. The device-state quality data may be stored in association with the device identifier for the given device in question, such as in a state-data quality database.

Figure 4A:
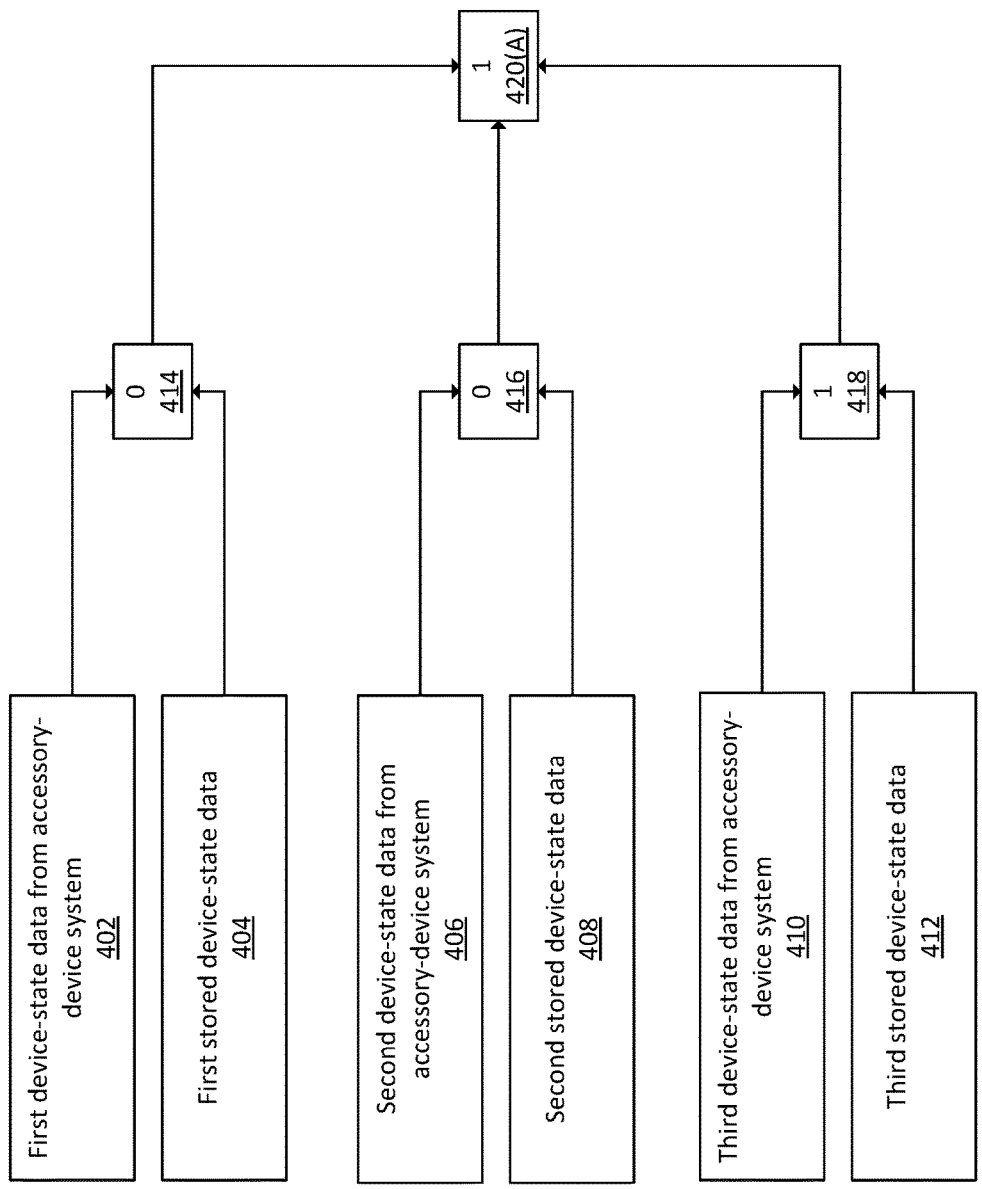
FIG. 4A illustrates a conceptual diagram of an example process for generating device-state quality data.

FIG. 4A illustrates a conceptual diagram of an example process for generating device-state quality data. FIG. 4A illustrates a scenario where an accessory-device system is polled three times for current device-state data for a given accessory device, such as using the processes described above. By way of illustration, the accessory device in question may be associated with an "on" state and an "off" state. It should be understood that the two states used here are used for illustration only and the accessory device may have any number of additional or different states.

For example, first device-state data 402 may be received from the accessory-device system at a first time, such as in response to a request for current device-state data from the polling processes described above. In this example, the first device-state data 402 may indicate that the current device-state for the accessory device is the "on" state. It should be understood that "time" or when an event is described as occurred at a given time, that time includes a period of time and/or duration of time and need not be a specific time or specific moment.

First stored device-state data 404 may also be available at the first time. For example, when an accessory device changes from an "off" state to an "on" state, the accessory device and/or the accessory-device system may send data indicating the state change. Additionally, or alternatively, a user may query for a device state using a voice-enabled device and/or a personal device. For example, the user may provide a user utterance such as "what is the status of Light 1?" The polling system, in attempting to respond to the user, may request the device status from the accessory-device system associated with Light 1. In other examples, the user may navigate to a screen on the personal device 106 that indicates device status of one or more accessory devices. When the user navigates to such a screen, the system may request a device status for device indicators to be displayed on the screen. In these and other examples, an indication of a state change may be received by the system and data indicating the state of a device may be stored. In this example, the first stored device-state data may indicate that the accessory device is in the "off" state.

Second device-state data 406 may also be received from the accessory-device system at a second time, such as in response to a request for current device-state data from the polling processes described above. In this example, the second device-state data 406 may indicate that the current device-state for the accessory device is the "off" state. Second stored device-state data 408 may also be available at the second time. In this example, the second stored device-state data 408 may indicate that the accessory device is in the "on" state.

Third device-state data 410 may also be received from the accessory-device system at a third time, such as in response to a request for current device-state data from the polling processes described above. In this example, the third device-state data 410 may indicate that the current device-state for the accessory device is the "off" state. Third stored device-state data 412 may also be available at the third time. In this example, the third stored device-state data 412 may indicate that the accessory device is in the "off" state. As such, three polling operations may have been completed, and the data associated with these polling operations may be utilized to generate accuracy values.

For example, a first accuracy value 414 may be generated from analyzing the first device-state data 402 in association with the first stored device-state data 404. In this example, given that the first device-state data 402 indicated the current device state to be the "on" state, and the first stored device-state data 404 indicated the device state to be the "off" state, the first device-state data 402 and the first stored device-state data 404 do not correspond. An accuracy value may be generated to indicate that the first device-state data 402 and the first stored device-state data 404 do not correspond. In the example shown in FIG. 4A, the first accuracy value 414 is "0." It should be understood that "0" is used by way of example and any other value and/or indicator may be utilized to show when current state data and stored state data correspond or do not correspond.

Additionally, a second accuracy value 416 may be generated from analyzing the second device-state data 406 in association with the second stored device-state data 408. In this example, given that the second device-state data 406 indicated the current device state to be the "off" state, and the second stored device-state data 408 indicated the device state to be the "on" state, the second device-state data 406 and the second stored device-state data 408 do not correspond. An accuracy value may be generated to indicate that the second device-state data 406 and the second stored device-state data 408 do not correspond. In the example shown in FIG. 4A, the second accuracy value 416 is "0."

Additionally, a third accuracy value 418 may be generated from analyzing the third device-state data 410 in association with the third stored device-state data 412. In this example, given that the third device-state data 410 indicated the current device state to be the "off" state, and the third stored device-state data 412 indicated the device state to be the "off" state, the third device-state data 410 and the third stored device-state data 412 correspond. An accuracy value may be generated to indicate that the third device-state data 410 and the third stored device-state data 412 correspond. In the example shown in FIG. 4A, the third accuracy value 418 is "1." As such, using the example in FIG. 4A, three accuracy values for the stored device-state data may be generated for a given accessory device. These accuracy values may be utilized to generate quality data.

For example, one or more scoring techniques may be utilized to generate the quality data 420(A) described herein. A first scoring technique, as illustrated in FIG. 4A, may include utilizing the most recent polling operation result and not utilizing prior results. In this example, the first scoring technique may result in device-state quality data of a "1.0" given that the third polling operation at the third time resulted in an accurate "1" result.

Figure 4B:
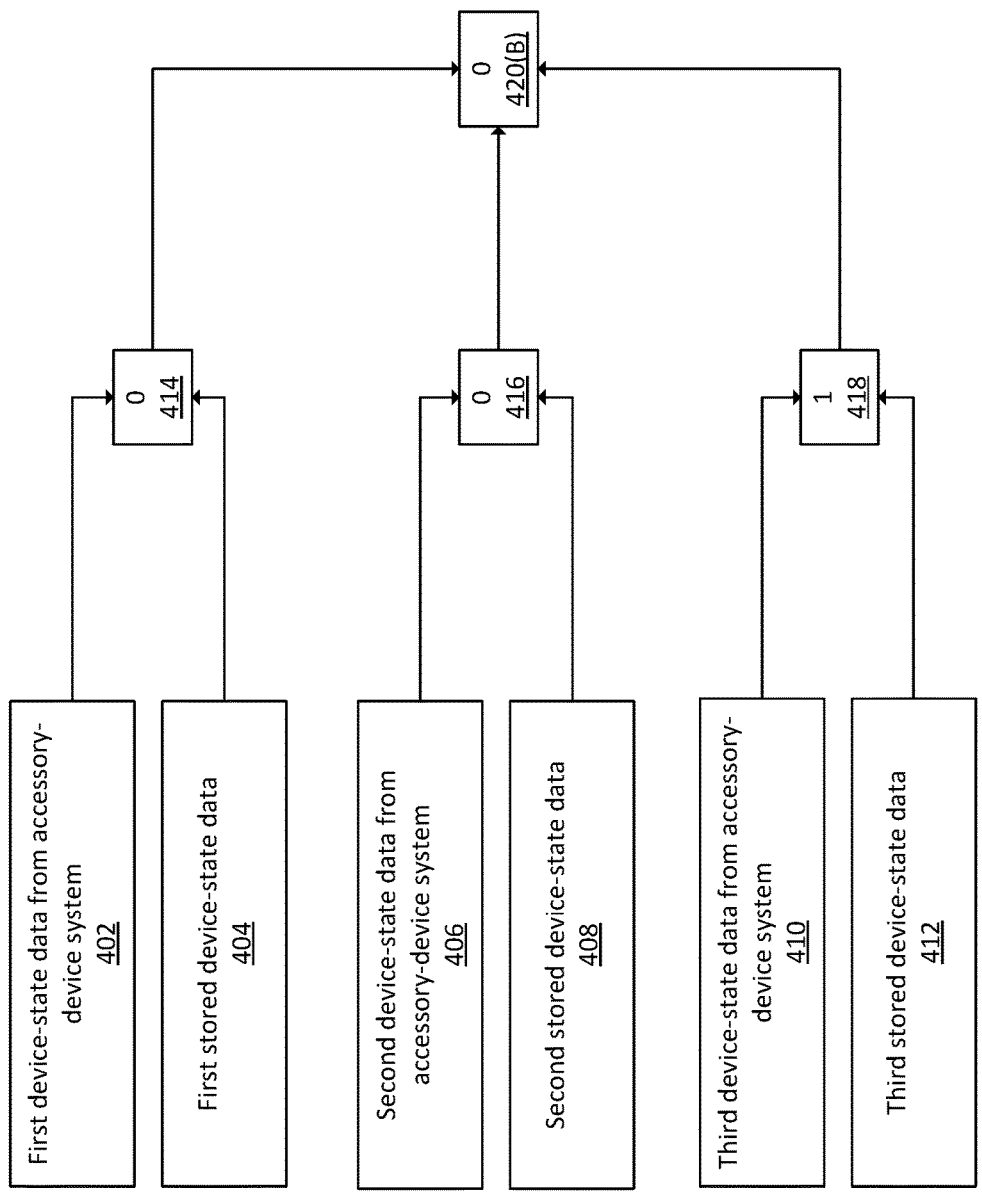
FIG. 4B illustrates a conceptual diagram of another example process for generating device-state quality data.

FIG. 4B illustrates a conceptual diagram of another example process for generating device-state quality data. FIG. 4B illustrates a scenario where an accessory-device system is polled three times for current device-state data for a given accessory device, such as using the processes described above. By way of illustration, the accessory device in question may be associated with an "on" state and an "off" state. It should be understood that the two states used here are used for illustration only and the accessory device may have any number of additional or different states.

For example, first device-state data 402 may be received from the accessory-device system at a first time, such as in response to a request for current device-state data from the polling processes described above. In this example, the first device-state data 402 may indicate that the current device-state for the accessory device is the "on" state. First stored device-state data 404 may also be available at the first time as described more fully above with respect to FIG. 4A. In this example, the first stored device-state data may indicate that the accessory device is in the "off" state.

Second device-state data 406 may also be received from the accessory-device system at a second time, such as in response to a request for current device-state data from the polling processes described above. In this example, the second device-state data 406 may indicate that the current device-state for the accessory device is the "off" state. Second stored device-state data 408 may also be available at the second time. In this example, the second stored device-state data 408 may indicate that the accessory device is in the "on" state.

Third device-state data 410 may also be received from the accessory-device system at a third time, such as in response to a request for current device-state data from the polling processes described above. In this example, the third device-state data 410 may indicate that the current device-state for the accessory device is the "off" state. Third stored device-state data 412 may also be available at the third time. In this example, the third stored device-state data 412 may indicate that the accessory device is in the "off" state. As such, three polling operations may have been completed, and the data associated with these polling operations may be utilized to generate accuracy values.

For example, a first accuracy value 414 may be generated from analyzing the first device-state data 402 in association with the first stored device-state data 404. In this example, given that the first device-state data 402 indicated the current device state to be the "on" state, and the first stored device-state data 404 indicated the device state to be the "off" state, the first device-state data 402 and the first stored device-state data 404 do not correspond. An accuracy value may be generated to indicate that the first device-state data 402 and the first stored device-state data 404 do not correspond. In the example shown in FIG. 4B, the first accuracy value 414 is "0." It should be understood that "0" is used by way of example and any other value and/or indicator may be utilized to show when current state data and stored state data correspond or do not correspond.

Additionally, a second accuracy value 416 may be generated from analyzing the second device-state data 406 in association with the second stored device-state data 408. In this example, given that the second device-state data 406 indicated the current device state to be the "off" state, and the second stored device-state data 408 indicated the device state to be the "on" state, the second device-state data 406 and the second stored device-state data 408 do not correspond. An accuracy value may be generated to indicate that the second device-state data 406 and the second stored device-state data 408 do not correspond. In the example shown in FIG. 4B, the second accuracy value 416 is "0."

Additionally, a third accuracy value 418 may be generated from analyzing the third device-state data 410 in association with the third stored device-state data 412. In this example, given that the third device-state data 410 indicated the current device state to be the "off" state, and the third stored device-state data 412 indicated the device state to be the "off" state, the third device-state data 410 and the third stored device-state data 412 correspond. An accuracy value may be generated to indicate that the third device-state data 410 and the third stored device-state data 412 correspond. In the example shown in FIG. 4B, the third accuracy value 418 is "1." As such, using the example in FIG. 4B, three accuracy values for the stored device-state data may be generated for a given accessory device. These accuracy values may be utilized to generate quality data.

For example, one or more scoring techniques may be utilized to generate the quality data 420(B) described herein. A second scoring technique, as illustrated in FIG. 4B, may include determining the most frequent result and utilizing that result to generate device-state quality data. In an example with two inaccurate "0" results and one accurate "1" result, the most frequent result would be "0" and utilizing the second scoring technique may result in device-state quality data 420(B) of "0.0."

FIG. 4C illustrates a conceptual diagram of another example process for generating device-state quality data. FIG. 4C illustrates a scenario where an accessory-device system is polled four times for current device-state data for a given accessory device, such as using the processes described above. By way of illustration, the accessory device in question may be associated with an "on" state and an "off" state. It should be understood that the two states used here are used for illustration only and the accessory device may have any number of additional or different states.

For example, first device-state data 402 may be received from the accessory-device system at a first time, such as in response to a request for current device-state data from the polling processes described above. In this example, the first device-state data 402 may indicate that the current device-state for the accessory device is the "on" state. First stored device-state data 404 may also be available at the first time as described more fully above with respect to FIG. 4A. In this example, the first stored device-state data may indicate that the accessory device is in the "off" state.

Second device-state data 406 may also be received from the accessory-device system at a second time, such as in response to a request for current device-state data from the polling processes described above. In this example, the second device-state data 406 may indicate that the current device-state for the accessory device is the "off" state. Second stored device-state data 408 may also be available at the second time. In this example, the second stored device-state data 408 may indicate that the accessory device is in the "on" state.

Third device-state data 410 may also be received from the accessory-device system at a third time, such as in response to a request for current device-state data from the polling processes described above. In this example, the third device-state data 410 may indicate that the current device-state for the accessory device is the "off" state. Third stored device-state data 412 may also be available at the third time. In this example, the third stored device-state data 412 may indicate that the accessory device is in the "off" state.

Fourth device-state data 422 may also be received from the accessory-device system at a fourth time, such as in response to a request for current device-state data from the polling processes described above. In this example, the fourth device-state data 422 may indicate that the current device-state for the accessory device is the "on" state. Fourth stored device-state data 424 may also be available at the fourth time. In this example, the fourth stored device-state data 424 may indicate that the accessory device is in the "on" state. As such, four polling operations may have been completed, and the data associated with these polling operations may be utilized to generate accuracy values.

For example, a first accuracy value 414 may be generated from analyzing the first device-state data 402 in association with the first stored device-state data 404. In this example, given that the first device-state data 402 indicated the current device state to be the "on" state, and the first stored device-state data 404 indicated the device state to be the "off" state, the first device-state data 402 and the first stored device-state data 404 do not correspond. An accuracy value may be generated to indicate that the first device-state data 402 and the first stored device-state data 404 do not correspond. In the example shown in FIG. 4C, the first accuracy value 414 is "0." It should be understood that "0" is used by way of example and any other value and/or indicator may be utilized to show when current state data and stored state data correspond or do not correspond.

Additionally, a second accuracy value 416 may be generated from analyzing the second device-state data 406 in association with the second stored device-state data 408. In this example, given that the second device-state data 406 indicated the current device state to be the "off" state, and the second stored device-state data 408 indicated the device state to be the "on" state, the second device-state data 406 and the second stored device-state data 408 do not correspond. An accuracy value may be generated to indicate that the second device-state data 406 and the second stored device-state data 408 do not correspond. In the example shown in FIG. 4C, the second accuracy value 416 is "0."

Additionally, a third accuracy value 418 may be generated from analyzing the third device-state data 410 in association with the third stored device-state data 412. In this example, given that the third device-state data 410 indicated the current device state to be the "off" state, and the third stored device-state data 412 indicated the device state to be the "off" state, the third device-state data 410 and the third stored device-state data 412 correspond. An accuracy value may be generated to indicate that the third device-state data 410 and the third stored device-state data 412 correspond. In the example shown in FIG. 4C, the third accuracy value 418 is "1."

Additionally, a fourth accuracy value 426 may be generated from analyzing the fourth device-state data 422 in association with the fourth stored device-state data 424. In this example, given that the fourth device-state data 422 indicated the current device state to be the "on" state, and the fourth stored device-state data 424 indicated the device state to be the "on" state, the fourth device-state data 422 and the fourth stored device-state data 424 correspond. An accuracy value may be generated to indicate that the fourth device-state data 422 and the fourth stored device-state data 424 correspond. In the example shown in FIG. 4C, the fourth accuracy value 426 is "1." As such, using the example in FIG. 4C, four accuracy values for the stored device-state data may be generated for a given accessory device. These accuracy values may be utilized to generate quality data.

For example, one or more scoring techniques may be utilized to generate the quality data 420(C) described herein. A third scoring technique, as illustrated in FIG. 4C, may include averaging the polling operation result and, in some examples, weighting most recent polling operation results more than less recent polling operation results. In the example used above with four results, an unweighted averaging technique may result in device-state quality data 420 of "0.5," given that two inaccurate "0" results and two accurate "1" results were determined. In a weighted averaging technique, the amount of occurrence of accurate "1" results may be determined, here 0.5. Additionally, the amount of occurrence of accurate "1" results across the most recent half of the occurrences may be determined, here 1.0. The two values may be summed and divided by two to determine the weighted value, here 0.75. This value may be determined to be the quality data 420(C).

FIG. 5 illustrates an example of data stored in a database and utilized for device-state quality analysis. For example, the data described with respect to FIG. 5 may be stored in association with the state-data quality database and/or the user registry, as described elsewhere herein. The data may include device identifiers 502, application identifiers 504, one or more characteristics 506 and/or states associated with a given accessory device, a last poll date 508, and/or an enablement date 510.

Using FIG. 5 as an example, for a given accessory device, a device identifier 502 representing the accessory device may be provided by the accessory-device system associated with the accessory device and/or by the polling system and/or by the accessory device itself. The device identifier 502 may be any set of information, including for example numbers and/or letters.

The application identifier 504, which may also be described herein as a "skill" identifier, may provide an indication of an application and/or an entity associated with the application utilized to control operation of a given accessory device. For example, Entity A may have developed an accessory device such as a smart lock, and may have developed an application that may be utilized by the personal device and/or a voice-enabled device to control operation of the smart lock. An application identifier 504 may be associated with such an application and/or entity to indicate which accessory-device system is associated with the accessory device.

The characteristics 506 may include one or more features of the accessory device that may change as operational states change. These features may indicate the states of the device, as described herein. For example, Some or all of these devices may operate in one or more states, such as, for example, an "on" state, an "off" state, a "locked" state, and "unlocked" state, an "armed" state, a "disarmed" state, etc. Additionally, or alternatively, the devices may be associated with one or more operational features, such as illumination color when the accessory device is a light bulb, temperature when the accessory device is a thermometer and/or a kitchen appliance, an audio-playback status when the accessory device is an audio-output device, an image-playback status when the accessory device is a video-output device, etc. When requests for device state are generated, the request may indicate which of the characteristics 506 are being polled. In response to the request, the accessory-device system may provide an indication of a current state of the device for the indicated characteristics 506.

The last poll date 508 may provide an indication of that last time a request for device-state data was generated and/or sent to the accessory-device system, and/or the last time a response including device-state data was received from the accessory-device system. The last poll date 508 may be utilized by the request scheduler to determine, at least in part, which accessory devices are to be polled for a given request. For example, device identifiers associated with a last poll date 508 that is before another last poll date 508 may be selected for polling before a device identifier associated with a last poll date 508 that is more recent. Additionally, device identifiers with last poll dates 508 indicating that polling has not yet been performed may be prioritized over device identifiers that have been associated with polling.

The enablement data 510 may provide an indication of when the accessory device was initiated for use and/or was enabled for use and/or setup for use. The enablement data 510 may be utilized by the request scheduler to prioritize which device identifiers are not be included in a given request. Some or all of the information discussed with respect to FIG. 5 may be utilized by the elastic mapping component and/or the query component and/or the request scheduler, as described more fully with respect to FIGS. 1 and 2. The enablement data 510 may otherwise be described herein as device-setup data and/or registration data and may indicate a time and/or a date at which a given device has been setup and/or when the device is registered with the polling system.

FIG. 6 illustrates an example of data stored in a database and utilized for determining device identifiers of accessory devices to be polled for device-state quality analysis. For example, the data described with respect to FIG. 6 may be stored in association with the state-data quality database and/or the user registry, as described elsewhere herein. The data may include device identifiers 502, application identifiers 504, and/or state-date quality scores 602, which may otherwise be described as quality data as used herein.

Using FIG. 6 as an example, for a given accessory device, a device identifier 502 representing the accessory device may be provided by the accessory-device system associated with the accessory device and/or by the polling system and/or by the accessory device itself. The device identifier 502 may be any set of information, including for example numbers and/or letters.

The application identifier 504, which may also be described herein as a "skill" identifier, may provide an indication of an application and/or an entity associated with the application utilized to control operation of a given accessory device. For example, Entity A may have developed an accessory device such as a smart lock, and may have developed an application that may be utilized by the personal device and/or a voice-enabled device to control operation of the smart lock. An application identifier 504 may be associated with such an application and/or entity to indicate which accessory-device system is associated with the accessory device.

The quality score 602 may provide an indication of a confidence and/or accuracy of stored device-state data. For example, polling operations may be performed as discussed herein. The results provided by the accessory-device systems may provide indications of current device states. Take, for example, six results returned by the accessory-device systems for a given accessory device. The first polling operation may result in an inaccurate "0" result, the second polling operation may result in an inaccurate "0" result, the third polling operation may result in an accurate "1" result, the fourth polling operation may result in an accurate "1" result, the fifth polling operation may result in an accurate "1" result, and the sixth polling operation may result in an inaccurate "0" result. One or more scoring techniques may be utilized to generate the quality data described herein. For example, a first scoring technique may include utilizing the most recent polling operation result and not utilizing prior results. In this example, the first scoring technique may result in device-state quality data of a "0" given that the sixth polling operation resulted in an inaccurate "0" result. In other examples, a second scoring technique may include determining the most frequent result and utilizing that result to generate device-state quality data. In an example with two inaccurate "0" results and one accurate "1" result, the most frequent result would be "0" and utilizing the second scoring technique may result in device-state quality data of "0.0." In other examples, a third scoring technique may include averaging the polling operation result and, in some examples, weighting most recent polling operation results more than less recent polling operation results. In the example used above with six results, an unweighted averaging technique may result in device-state quality data of "0.5," given that three inaccurate "0" results and three accurate "1" results were determined. In a weighted averaging technique, the amount of occurrence of accurate "1" results may be determined, here 0.5. Additionally, the amount of occurrence of accurate "1" results across the most recent half of the occurrences may be determined, here 0.66. The two values may be summed and divided by two to determine the weighted value, here 0.58.

The quality score 602 may provide an indication of the result of the scoring techniques described above. Additionally, a threshold score may be identified, determined, and/or generated and may be used to determine which device identifiers should be associated with subsequent and/or more frequent polling operations. In the example of FIG. 6, a threshold score of 0.75 may be set. As can be seen, the first three device identifiers are associated with quality scores that are below the threshold score, here 0.0, 0.74, and 0.62, respectively. In these examples, the device identifiers with quality scores 602 that fall below the threshold score may be included in subsequent schedules for device-state polling, while those device identifiers associated with quality scores 602 that are at or above the threshold score may not be included in subsequent polling operations and/or may be included in polling operations less frequently than the devices identifiers associated with quality scores 602 that are below the threshold score. The quality scores 602 may be utilized, at least in part, to generate a new request 604, such as by the request scheduler including the device identifiers associated with the quality scores 602 in subsequent polling schedules. Additionally, the last polling date, as described with respect to FIG. 5, may be utilized to generate the new request 604.

Figure 7:
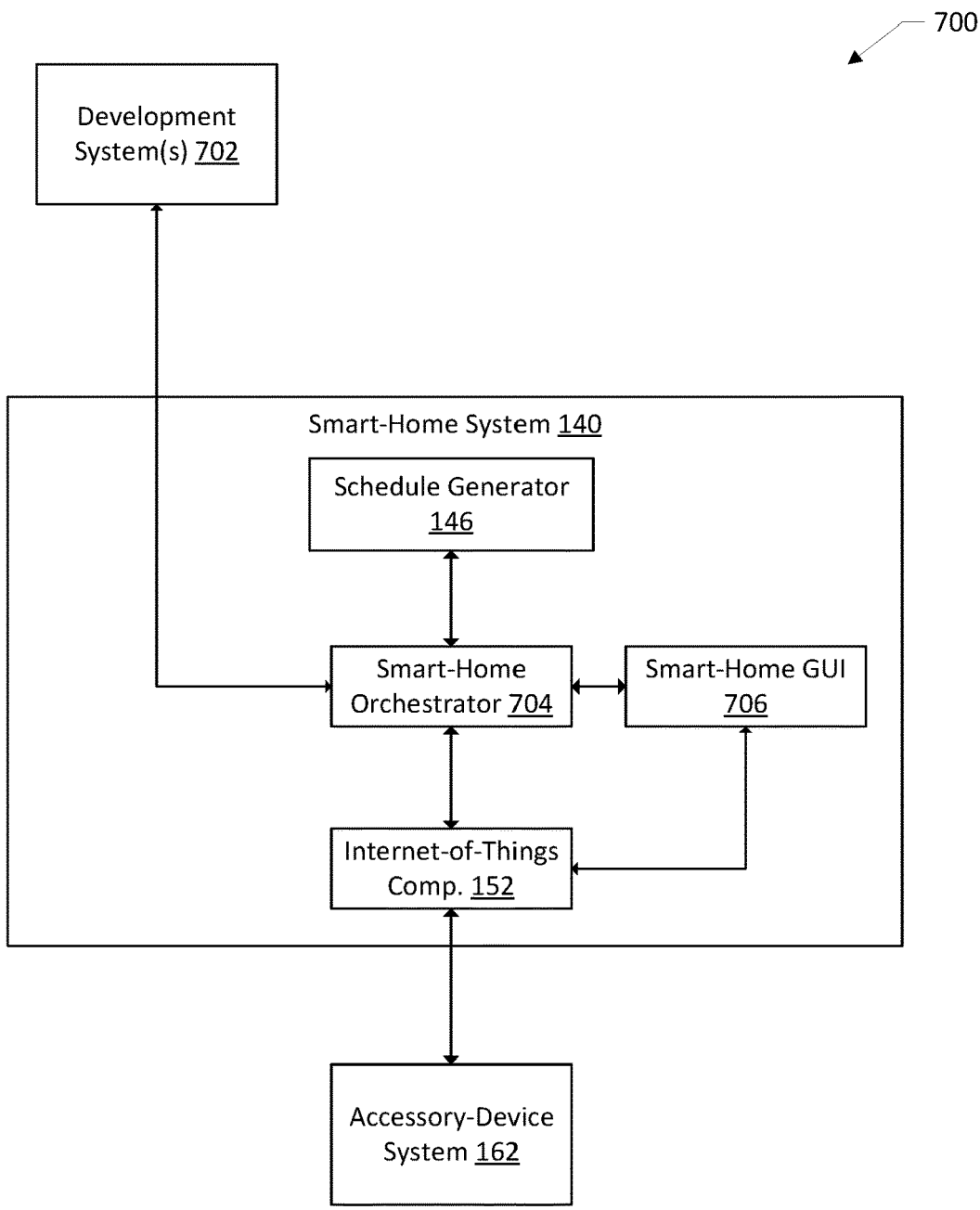
FIG. 7 illustrates a conceptual diagram of example components of a smart-home system.

FIG. 7 illustrates a conceptual diagram of example components of a smart-home system. The smart-home system 140 may include components described above with respect to FIG. 1, such as a smart-home speechlet, a user registry 138, and/or an internet-of-things component 152, for example. The smart-home system 140 may also be configured to send data to and receive data from other components of a system and/or one or more other systems. For example, the other components may include one or more development systems 702. The smart-home system 140 may also include components such as a smart-home orchestrator 704 and/or a smart-home graphical user interface (GUI) 706. Each of these components will be described in detail below.

As described herein, a user may interact with an accessory device using tactile input to the accessory device, voice input to a voice-enabled device, and/or input to an application residing on and/or accessible to a personal device. When a user interacts with an accessory device using voice input to a voice-enabled device, audio data representing user utterances may be received at the speech-processing system. The speech-processing system may analyze the audio data and/or corresponding text data generated, by way of example, using an ASR component, to determine that the user utterance represents an intent to control an accessory device.

In other examples, the smart-home system 140 may be configured to receive requests for quality data associated with given accessory devices. For example, a user of the development system 702 may desire to determine how accurate stored device-state data is for the given accessory devices. In these examples, the development system 702 may send a request for priority polling, which may be received by the smart-home system 140, such as via the orchestrator 704. The orchestrator 704 may recognize the request and may provide the request to the request scheduler 146 to commence generation polling schedules, as described elsewhere herein.

Additionally, or alternatively, as mentioned above, the accessory devices may be operated based at least in part on input data received from an application residing on and/or accessible to a personal device, such as a mobile phone and/or computer. The smart-home GUI 706 may be utilized to receive the input data and/or to display device-state statuses to a user. For example, the smart-home GUI 706 may be utilized to display device states and/or to initiate a query for device states from the accessory-device systems 162. The internet-of-things component 162 may be configured to send polling requests to and receive responses from the accessory-device systems 162 as described more fully above.

Figure 8:
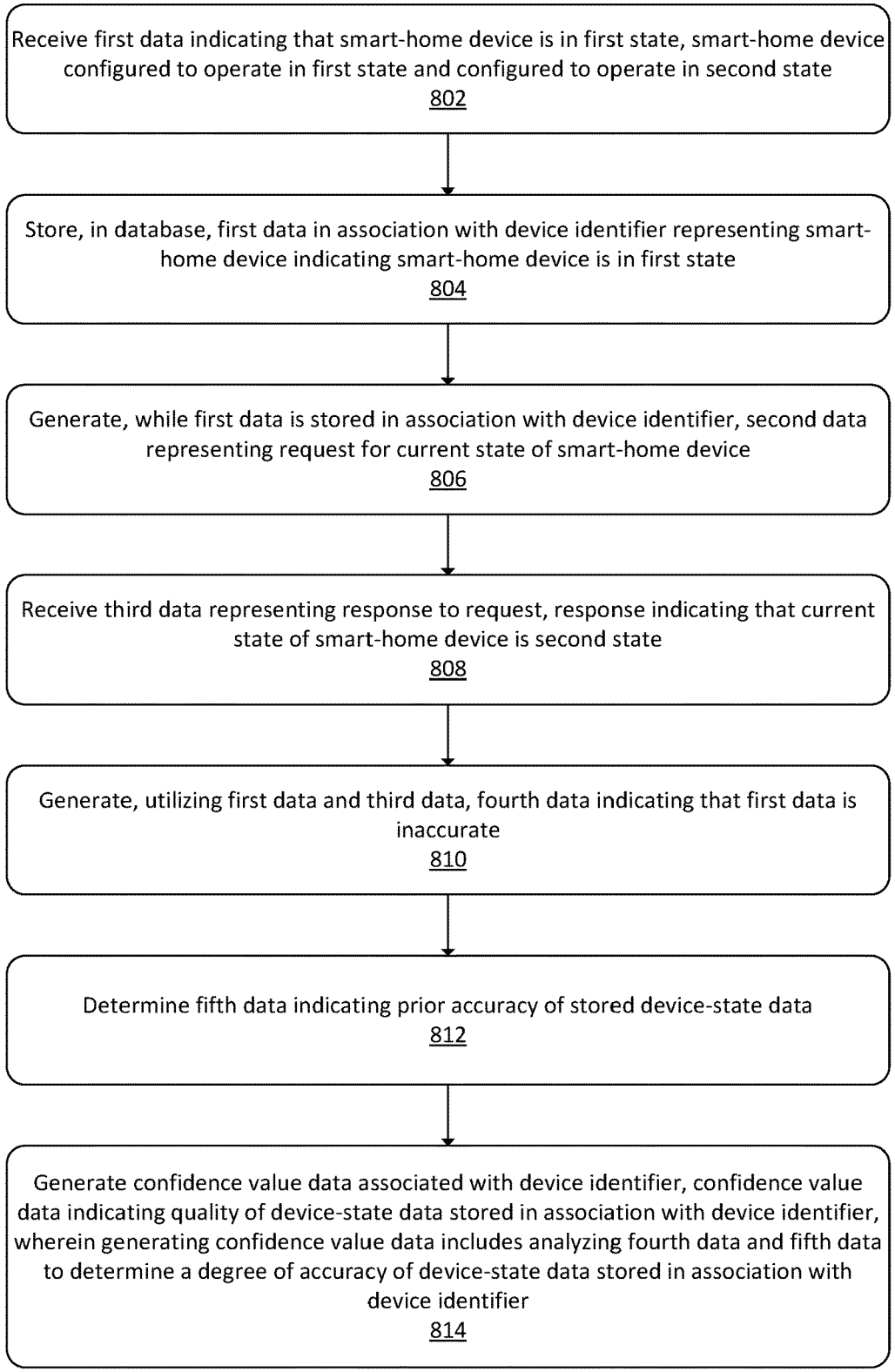
FIG. 8 illustrates a flow diagram of an example process for device-state quality analysis.
Figure 9:
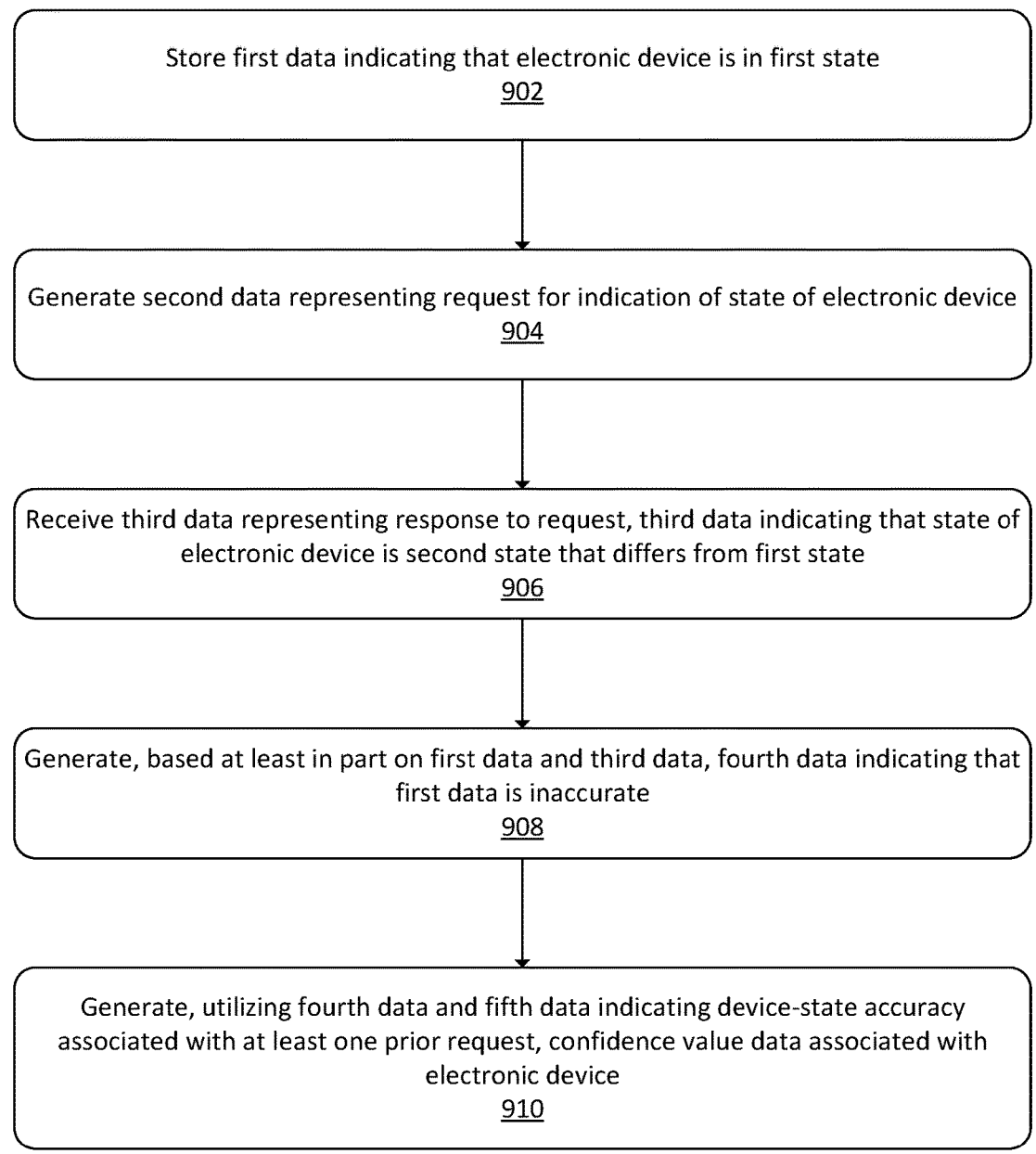
FIG. 9 illustrates a flow diagram of another example process for device-state quality analysis.

FIGS. 8 and 9 illustrate processes for device-state quality analysis. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, and 4A-7, although the processes may be implemented in a wide variety of other environments, architectures and systems.

FIG. 8 illustrates a flow diagram of another example process 800 for device-state quality analysis. The order in which the operations or steps are described is not intended to be construed as a limitation, and any number of the described operations may be combined in any order and/or in parallel to implement process 800.

At block 802, the process 800 may include receiving first data indicating that a smart-home device is in a first state, the smart-home device configured to operate in the first state and configured to operate in a second state. For example, when an accessory device changes from an "off" state to an "on" state, the accessory device, such as a smart-home device, and/or an accessory-device system may send data indicating the state change. Additionally, or alternatively, a user may query for a device state using a voice-enabled device and/or a personal device. For example, the user may provide a user utterance such as "what is the status of Light 1?" The remote system, in attempting to respond to the user, may request the device status from the accessory-device system associated with Light 1. In other examples, the user may navigate to a screen on the personal device 106 that indicates device status of one or more accessory devices. When the user navigates to such a screen, the system may request a device status for device indicators to be displayed on the screen. In these and other examples, an indication of a state change may be received by the system and data indicating the state of a device may be received.

At block 804, the process 800 may include storing, in a database, the first data in association with a device identifier representing the smart-home device indicating the smart-home device is in the first state. For example, the first data may be stored in association with a user registry, and/or a data store that associates device identifiers for accessory devices with indicators of device state.

At block 806, the process 800 may include generating, while the first data is stored in association with the device identifier, second data representing a request for a current state of the smart-home device. For example, a request component may query a request queue for device identifiers and application identifiers associated with a given polling schedule. Based at least in part on the application identifier, which provides an indication of the accessory-device system to be polled, and the device identifiers, which provides an indication of which accessory devices are to be polled, the request component may generate one or more requests for the current device-state status of the accessory devices in question.

When generating the requests, the request component may receive, from a request-configuration component and for some or all of the accessory-device systems, a request capacity, which may also be described as a TPS value, for a given period of time. For example, a first accessory-device system may have a request capacity of 1,000 device identifiers for a given day, while a second accessory-device system may have a request capacity of 100,000 device identifiers for a given day. In these and other examples, the request component may utilize this information to configure the requests to comply with the request capacity associated with a given accessory-device system. The requests may include one or more instructions to return current device-state results to the system for a given set of device identifiers.

In examples, the process 800 may include sending the second data to the accessory-device system. In examples, the request component may send the request to an internet-of-things component, which may facilitate the sending of the requests to the accessory-device system and/or receipt of the responses from the accessory-device system. The internet-of-things component may be configured to, in examples, format the requests to comply with conditions and/or requirements of a given accessory-device system. The internet-of-things component may also provide security measures for the sending and/or receipt of data with the accessory-device systems. The internet-of-things component may send the request to the accessory-device system.

At block 808, the process 800 may include receiving third data representing a response to the request, the response indicating that the current state of the smart-home device is the second state. For example, the response may include the device identifiers and may associate a value and/or indicator of a state of the devices associated with the device identifiers. In examples, an indicator of state may be provided for one or more of the characteristics of the device.

At block 810, the process 800 may include generating, utilizing the first data and the third data, fourth data indicating that the first data is inaccurate. For example, the current device-state data may indicate that Device 1 is in an "on" state, but stored device-state data for Device 1 indicates that Device 1 is in an "off" state. In these examples, a response analysis component may determine that the current device-state data from the response differs from the stored device-state data. The same or a similar analysis may be performed for some or all of the device identifiers associated with the request. For instances where the response data differs with respect to the stored device-state data, such as if the state of the device in question differs as between the current device-state data and the stored device-state data, an indication of this result, such as a "0," may be determined. For instances where the response data corresponds to the stored device-state data, such as if the state of the device in question is the same as between the current device-state data and the stored device-state data, an indication of this result, such as "1," may be determined.

At block 812, the process 800 may include determining fifth data indicating prior accuracy of stored device-state data. The fifth data may be determined and/or generated in the same or a similar manner as described with respect to block 810.

At block 814, the process 800 may include generating confidence value data associated with the device identifier, the confidence value data indicating quality of device-state data stored in association with the device identifier, wherein generating the confidence value data includes analyzing the fourth data and the fifth data to determine a degree of accuracy of the device-state data stored in association with the device identifier. For example, one or more scoring techniques may be utilized to generate the quality data described herein. For example, a first scoring technique may include utilizing the most recent polling operation result and not utilizing prior results. In other examples, a second scoring technique may include determining the most frequent result and utilizing that result to generate device-state quality data. In other examples, a third scoring technique may include averaging the polling operation result and, in some examples, weighting most recent polling operation results more than less recent polling operation results.

Additionally, or alternatively, the process 800 may include determining that the first data was received in response to a user query for device-state status and receiving sixth data indicating that the smart-home device is in the second state. The process 800 may also include generating seventh data representing a second request for the current state of the smart-home device and sending the seventh data to the remote system. The process 800 may also include receiving eighth data representing a second response to the second request. In these examples, the second response may indicate that the current state of the smart-home device is the second state. The process 800 may also include determining, utilizing the sixth data and the eighth data, that the sixth data is accurate and determining that the sixth data was received without a user query. The process 800 may also include determining that device-state data received without the user query is more accurate than device state-data received in response to the user query.

Additionally, or alternatively, the process 800 may include generating, based at least in part on determining that the first data is inaccurate, sixth data representing a device-status scheduling request. In these examples, the device-status scheduling request may indicate that a second request for the current state of the smart-home device is to be generated. The process 800 may also include generating, utilizing the device-status request schedule, seventh data representing the second request. The process 800 may also include receiving eighth data indicating that the current state of the smart-home device is the second state. In these examples, generating the confidence value data may be based at least in part on the eighth data.

Additionally, or alternatively, the process 800 may include receiving a second request for device-state data, where the second request may be associated with a priority level and the first request may be associated with another priority level. The process 800 may also include determining that the priority level for the first request is lower and/or represents a lesser priority than the priority level for the second request. The process 800 may also include generating sixth data representing the second request and sending the sixth data prior to sending the third data based at least in part on determining that the priority level for the first request represents the lesser priority.

FIG. 9 illustrates a flow diagram of another example process 900 for device-state quality analysis. The order in which the operations or steps are described is not intended to be construed as a limitation, and any number of the described operations may be combined in any order and/or in parallel to implement process 900.

At block 902, the process 900 may include storing first data indicating that an electronic device is in a first state. For example, when an electronic device, also described herein as an accessory device, changes from an "off" state to an "on" state, the accessory device, such as a smart-home device, and/or an accessory-device system may send data indicating the state change. Additionally, or alternatively, a user may query for a device state using a voice-enabled device and/or a personal device. For example, the user may provide a user utterance such as "what is the status of Light 1?" The remote system, in attempting to respond to the user, may request the device status from the accessory-device system associated with Light 1. In other examples, the user may navigate to a screen on the personal device 106 that indicates device status of one or more accessory devices. When the user navigates to such a screen, the system may request a device status for device indicators to be displayed on the screen. In these and other examples, an indication of a state change may be received by the system and data indicating the state of a device may be received.

At block 904, the process 900 may include generating second data representing a request for an indication of a state of the electronic device. For example, a request component may query a request queue for device identifiers and application identifiers associated with a given polling schedule. Based at least in part on the application identifier, which provides an indication of the accessory-device system to be polled, and the device identifiers, which provides an indication of which accessory devices are to be polled, the request component may generate one or more requests for the current device-state status of the accessory devices in question.

When generating the requests, the request component may receive, from a request-configuration component and for some or all of the accessory-device systems, a request capacity, which may also be described as a TPS value, for a given period of time. For example, a first accessory-device system may have a request capacity of 1,000 device identifiers for a given day, while a second accessory-device system may have a request capacity of 100,000 device identifiers for a given day. In these and other examples, the request component may utilize this information to configure the requests to comply with the request capacity associated with a given accessory-device system. The requests may include one or more instructions to return current device-state results to the system for a given set of device identifiers.

In examples, the process 900 may also include sending the second data to the accessory-device system. In examples, the request component may send the request to an internet-of-things component, which may facilitate the sending of the requests to the accessory-device system and/or receipt of the responses from the accessory-device system. The internet-of-things component may be configured to, in examples, format the requests to comply with conditions and/or requirements of a given accessory-device system. The internet-of-things component may also provide security measures for the sending and/or receipt of data with the accessory-device systems. The internet-of-things component may send the request to the accessory-device system.

At block 906, the process 900 may include receiving third data representing a response to the request, the third data indicating that the state of the electronic device is a second state that differs from the first state. For example, the response may include the device identifiers and may associate a value and/or indicator of a state of the devices associated with the device identifiers. In examples, an indicator of state may be provided for one or more of the characteristics of the device.

At block 908, the process 900 may include generating, based at least in part on the first data and the third data, fourth data indicating that the first data is inaccurate. For example, the current device-state data may indicate that Device 1 is in an "on" state, but stored device-state data for Device 1 indicates that Device 1 is in an "off" state. In these examples, a response analysis component may determine that the current device-state data from the response differs from the stored device-state data. The same or a similar analysis may be performed for some or all of the device identifiers associated with the request. For instances where the response data differs with respect to the stored device-state data, such as if the state of the device in question differs as between the current device-state data and the stored device-state data, an indication of this result, such as a "0," may be determined. For instances where the response data corresponds to the stored device-state data, such as if the state of the device in question is the same as between the current device-state data and the stored device-state data, an indication of this result, such as "1," may be determined.

At block 910, the process 900 may include generating, utilizing the fourth data and fifth data indicating device-state accuracy associated with at least one prior request, confidence value data associated with the electronic device. For example, one or more scoring techniques may be utilized to generate the quality data described herein. For example, a first scoring technique may include utilizing the most recent polling operation result and not utilizing prior results. In other examples, a second scoring technique may include determining the most frequent result and utilizing that result to generate device-state quality data. In other examples, a third scoring technique may include averaging the polling operation result and, in some examples, weighting most recent polling operation results more than less recent polling operation results.

Additionally, or alternatively, the process 900 may include determining that the first data was received in response to a user query for device-state status and receiving sixth data indicating that the electronic device is in the second state. The process 900 may also include generating seventh data representing a second request for the state of the electronic device. The process 900 may also include receiving eighth data representing a second response to the second request. In these examples, the eighth data may indicate that the current state of the electronic device is the second state. The process 900 may also include determining, utilizing the sixth data and the seventh data, that the sixth data is accurate and determining that the sixth data was received without a user query. The process 900 may also include determining that device-state data received without the user query is more accurate than device-state data received in response to the user query.

Additionally, or alternatively, the process 900 may include determining that the first data was received in association with a non-skill application associated with the electronic device. The process 900 may also include storing sixth data indicating that the electronic device is in the second state, and generating seventh data representing a second request for the state of the electronic device. The process 900 may also include receiving eighth data representing a second response to the second request, the eighth data indicating that the state is the second state and determining, based at least in part on the sixth data and the eighth data, that the sixth data is accurate. The process 900 may also include determining that the sixth data was received in association with a skill associated with the electronic device and determining that device-state data received in association with a skill is more accurate than device-state data received in association with the non-skill application.

Additionally, or alternatively, the process 900 may include generating, based at least in part on determining that the first data is inaccurate, sixth data representing a device-status scheduling request. In these examples, the device-status scheduling request may indicate that a second request for the current state of the electronic device is to be generated. The process 900 may also include generating, utilizing the device-status scheduling request, seventh data representing the second request. The process 900 may also include receiving eighth data indicating that the current state of the electronic device is the second state. In these examples, generating the confidence value data may be based at least in part on the eighth data.

Additionally, or alternatively, the process 900 may include receiving a second request for device-state data, where the second request may be associated with a priority level and the first request may be associated with another priority level. The process 900 may also include determining that the priority level for the first request represents lower and/or a lesser priority than the priority level for the second request. In other examples, the process 900 may include analyzing the priority levels to determine which is indicated to be more favorable. The process 900 may also include generating sixth data representing the second request and sending the sixth data prior to sending the second data based at least in part on analyzing the priority level for the first request and the priority level for the second request.

Additionally, or alternatively, the process 900 may include generating sixth data representing a second request for an indication of the state of the electronic device. The process 900 may also include receiving seventh data representing a second response to the second request. In these examples, the second response may indicate that the state of the electronic device is the first state. The process 900 may also include generating, based at least in part on the first data and the seventh data, eighth data indicating that the first data is accurate. In these examples, generating the confidence value may be based at least in part on the eighth data.

Additionally, or alternatively, the process 900 may include identifying a number of tasks per second that are permitted by the accessory-device system and generating a device-state scheduling request with a number of requests based at least in part on the number of tasks per second. In these examples, the device-state scheduling request may include the request, and generating the second data may comprise generating the second data based at least in part on the device-state scheduling request.

Additionally, or alternatively, the process 900 may include receiving an indication that a second electronic device has been enabled for use. The process 900 may also include generating a device-state scheduling request indicating requests for device states. In these examples, the device-state scheduling request schedule may include a second request for the state of the second electronic device based at least in part on the indication. The process 900 may also include generating sixth data representing the second request based at least in part on the device-state scheduling request.

Additionally, or alternatively, the process 900 may include receiving, after the third data is received, sixth data indicating that the state of the electronic device is the first state. The process 900 may also include generating, based at least in part on the sixth data, seventh data indicating that the first data is accurate and causing a weighting factor to be applied to the seventh data based at least in part on the sixth data being received after the third data.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method, comprising:
storing first data indicating that a first electronic device is in a first state;
receiving second data indicating that a state of the first electronic device is a second state that differs from the first state;
generating, based at least in part on the first data and the second data, third data indicating that the first data is inaccurate; and
generating, utilizing the third data and prior device-state accuracy data, confidence value data associated with the first electronic device.

2. The method of claim 1, further comprising:
determining that the second data was received in association with a first application of a first application type;
generating a request for the state of the first electronic device;
receiving a response to the request, the response received in association with a second application of a second application type and indicating that the state is the second state; and
determining, based at least in part on the response, that device-state data received in association with the second application type is more accurate than device-state data received in association with the first application type.

3. The method of claim 1, further comprising:
generating, based at least in part on the first data being inaccurate, scheduling data indicating that a request for the state of the first electronic device is to be generated; and
generating, based at least in part on the scheduling data, the request.

4. The method of claim 1, wherein receiving the second data is based at least in part on sending a first request for the second data, the first request associated with a first priority, and the method further comprises:
receiving a second request for device-state data, the second request associated with a second priority; and
sending, based at least in part on the first priority and the second priority, the second request prior to the first request.

5. The method of claim 1, further comprising:
generating a request for an indication of the state of the first electronic device;
receiving a response to the request indicating that the state of the first electronic device is the first state;
generating, based at least in part on the first data and the response, fourth data indicating that the first data is accurate; and
wherein generating the confidence value data includes generating the confidence value data based at least in part on the fourth data.

6. The method of claim 1, further comprising:
identifying a number of tasks per second that are permitted by a remote system associated with the first electronic device;
generating scheduling data with a number of requests based at least in part on the number of tasks per second; and
sending a request for the second data based at least in part on the scheduling data.

7. The method of claim 1, further comprising:
receiving an indication that a second electronic device has been enabled for use;
generating scheduling data indicating requests for device states, the scheduling data including a request for the state of the second electronic device based at least in part on the indication; and
generating the request based at least in part on the scheduling data.

8. The method of claim 1, further comprising:
receiving fourth data indicating that the state of the first electronic device is the first state;
generating, based at least in part on the fourth data, fifth data indicating the first data is accurate; and
causing a weighting factor to be applied to the fifth data based at least in part on the fourth data being received after the second data.

9. The method of claim 1, further comprising:
receiving an indication that a second electronic device has been enabled for use;
determining, based at least in part on the indication, scheduling data for sending a command to a remote system to return current device-state data associated with the second electronic device; and
sending the command to the remote system based at least in part on the scheduling data.

10. The method of claim 1, further comprising:
determining a group of devices that includes the first electronic device;
determining an identifier of a second electronic device in the group of devices; and
sending a command to return current device-state data for the second electronic device based at least in part on the second electronic device being associated with the group of devices.

11. A system, comprising:
one or more processors; and
non-transitory computer-readable media storing instructions that, when executed by the one or more processors, cause the one or more processors to perform operations comprising:
storing first data indicating that a first electronic device is in a first state;
receiving second data indicating that a state of the first electronic device is a second state that differs from the first state;
generating, based at least in part on the first data and the second data, third data indicating that the first data is inaccurate; and
generating, utilizing the third data and prior device-state accuracy data, confidence value data associated with the first electronic device.

12. The system of claim 11, the operations further comprising:
determining that the second data was received in association with a first application of a first application type;
generating a request for the state of the first electronic device;
receiving a response to the request, the response received in association with a second application of a second application type and indicating that the state is the second state; and
determining, based at least in part on the response, that device-state data received in association with the second application type is more accurate than device-state data received in association with the first application type.

13. The system of claim 11, the operations further comprising:
generating, based at least in part on the first data being inaccurate, a scheduling request indicating that a request for the state of the first electronic device is to be generated; and
generating, based at least in part on the scheduling request, the request.

14. The system of claim 11, wherein receiving the second data is based at least in part on sending a first request for the second data, the first request associated with a first priority, and the operations further comprise:
receiving a second request for device-state data, the second request associated with a second priority; and
sending, based at least in part on the first priority and the second priority, the second request prior to the first request.

15. The system of claim 11, the operations further comprising:
generating a request for an indication of the state of the first electronic device;
receiving a response to the request indicating that the state of the first electronic device is the first state;
generating, based at least in part on the first data and the response, fourth data indicating that the first data is accurate; and
wherein generating the confidence value data includes generating the confidence value data based at least in part on the fourth data.

16. The system of claim 11, the operations further comprising:
identifying a number of tasks per second that are permitted by a remote system associated with the first electronic device;
generating a device-state scheduling request with a number of requests based at least in part on the number of tasks per second; and
sending a request for the second data based at least in part on the device-state scheduling request.

17. The system of claim 11, the operations further comprising:
receiving an indication that a second electronic device has been enabled for use;
generating a device-state scheduling request indicating requests for device states, the device-state scheduling request including a request for the state of the second electronic device based at least in part on the indication; and
generating the request based at least in part on the device-state scheduling request.

18. The system of claim 11, the operations further comprising:
receiving fourth data indicating that the state of the first electronic device is the first state;
generating, based at least in part on the fourth data, fifth data indicating the first data is accurate; and
causing a weighting factor to be applied to the fifth data based at least in part on the fourth data being received after the second data.

19. The system of claim 11, the operations further comprising:
receiving an indication that a second electronic device has been enabled for use;
determining, based at least in part on the indication, scheduling data for sending a command to a remote system to return current device-state data associated with the second electronic device; and
sending the command to the remote system based at least in part on the scheduling data.

20. The system of claim 11, the operations further comprising:
determining a group of devices that includes the first electronic device;
determining an identifier of a second electronic device in the group of devices; and
sending a command to return current device-state data for the second electronic device based at least in part on the second electronic device being associated with the group of devices.

* * * * *